United States Patent
Shahverdi-Shahraki et al.

(10) Patent No.: US 9,676,926 B2
(45) Date of Patent: Jun. 13, 2017

(54) PET NANOCOMPOSITE MATERIALS AND CONTAINERS PREPARED THEREFROM

(71) Applicants: La Corporation de l'Ecole Polytechnique de Montreal, Montreal (CN); PepsiCo, Inc., Purchase, NY (US)

(72) Inventors: Khalil Shahverdi-Shahraki, Montreal (CA); Abdellah Ajii, Montreal (CA); Pierre Carreau, Montreal (CA); Tamal Ghosh, Purchase, NY (US); Kamal Mahajan, Purchase, NY (US)

( * ) Notice: Subject to any disclaimer, the term of this patent is extended or adjusted under 35 U.S.C. 154(b) by 0 days.

(21) Appl. No.: 14/775,970

(22) PCT Filed: Feb. 11, 2014

(86) PCT No.: PCT/US2014/015798
§ 371 (c)(1),
(2) Date: Sep. 14, 2015

(87) PCT Pub. No.: WO2014/163765
PCT Pub. Date: Oct. 9, 2014

(65) Prior Publication Data
US 2016/0024283 A1 Jan. 28, 2016

Related U.S. Application Data

(60) Provisional application No. 61/778,571, filed on Mar. 13, 2013.

(51) Int. Cl.
C08K 9/04 (2006.01)
C08K 9/02 (2006.01)
B65D 25/54 (2006.01)
B65D 85/72 (2006.01)

(52) U.S. Cl.
CPC ............... *C08K 9/04* (2013.01); *B65D 25/54* (2013.01); *B65D 85/72* (2013.01); *C08K 9/02* (2013.01); *C08K 2201/011* (2013.01)

(58) Field of Classification Search
CPC combination set(s) only.
See application file for complete search history.

(56) References Cited

U.S. PATENT DOCUMENTS

| 4,489,110 | A | | 12/1984 | Bier | |
|---|---|---|---|---|---|
| 5,932,341 | A | * | 8/1999 | Endo | B32B 27/08 428/327 |
| 2007/0106006 | A1 | * | 5/2007 | Cooper | C08K 3/04 524/445 |
| 2007/0254150 | A1 | | 11/2007 | Seino et al. | |
| 2010/0272831 | A1 | * | 10/2010 | Lagaron Cabello | C08K 9/08 424/725 |
| 2011/0054105 | A1 | * | 3/2011 | Feeney | C09D 167/00 524/446 |
| 2012/0157607 | A1 | | 6/2012 | Lee et al. | |

FOREIGN PATENT DOCUMENTS

| CN | 102744941 | 10/2012 |
|---|---|---|
| JP | S5621833 | 2/1981 |

OTHER PUBLICATIONS

Smith, et al., Science 153 (3737), 741-743, 1966.*
Database WPI, Week 198117, Thomson Scientific, London, GB; AN 1981-29658d, XP002725122.
Database WPI, Week 201345, Thomson Scientific, London, GB; AN 2013-B16043, XP002725123.
Feb. 11, 2014—(ISR/WO) International Search Report—App PCT/US2014/015798.
English Translation of Notification of the First Office Action issued in Chinese Application No. 20148005169.0, mailed Jan. 26, 2017, 10 pages.

* cited by examiner

*Primary Examiner* — Vickey Nerangis
(74) *Attorney, Agent, or Firm* — Sterne, Kessler, Goldstein & Fox P.L.L.C.

(57) ABSTRACT

PET nanocomposite materials exhibit improved physical properties in a PET composite as a result of the intercalation of non smectite-type clay materials while maintaining transparency and barrier properties. In some aspects, kaolin particles are modified with potassium acetate (KAc) to increase interlamellar distances and improve particle dispersion. In other aspects, calcined kaolin particles are used and may be chemically treated by an aqueous alcohol solutions method. Any loss in the molecular weight of PET composite can be offset by the further incorporation of surface compatibilizers such as silane coupling agents and other process additives such as molecular chain extenders.

12 Claims, 20 Drawing Sheets

PET NANOCOMPOSITE MATERIALS AND CONTAINERS PREPARED THEREFROM

CROSS REFERENCE TO RELATED APPLICATION

This application claims priority to U.S. Application No. 61/778,571, filed Mar. 13, 2013, the disclosure of which is hereby incorporated by reference in its entirety.

BACKGROUND

Polyethylene terephthalate (PET) has found many packaging applications specifically in the production of soft drink bottles for a long time due in part at least to its high transparency and good mechanical and barrier properties. In recent years consumption of soft drinks, along with other beverages, has increased extensively which has given rise to the production of large quantities of packaging materials such as PET. Besides economic issues with production and disposal, these materials are mainly nonbiodegradable and are subject to some environmental issues. Therefore finding new methods to lower the economic and environmental impacts of such materials is highly desirable. Improving the mechanical properties of PET, without impacting its transparency and barrier properties, makes it possible to reduce the weight of rigid packaging such as bottles.

PET is one of the industrialized aromatic polyester materials, which has been widely applied in the fields of fiber, film and specifically the production of drink bottles due to high transparency and good barrier properties. Since PET is a stable and non-degradable compound in environment, it has been always a big challenge to reduce the economic and environmental impacts of PET-based products. In other words, it is favorable to use less material without losing the properties (light packaging). To do so, the material must have higher mechanical properties in order to retain the shape stability and the properties required by end users. Although there is a large demand for the development of reduced weight packaging systems, relatively low barrier and mechanical properties are the main drawbacks of such packaging.

Nanocomposites are a new class of engineering materials which have found many applications in various industrial fields such as automotive, construction, and packaging due to their excellent properties, low cost and weight. Based on the fact that polymeric materials, such as PET, suffer from lack of thermal stability and low modulus in comparison with other engineering materials such as metals, different types of filler have been incorporated to polymer matrices to overcome these shortcomings. These traditional fillers are usually in the range of micrometers in size.

With the development of nanoparticles and due to their advantages, many researchers have considered using them as nanofillers to reinforce polymer composites. Nanoparticles can provide a large contact area between different phases in the composite which may result in a significant reinforcement effect on polymers. Developing composite materials by addition of fillers to a polymeric matrix can improve many properties of the material. Fillers having a layered structure, such as smectite-type clays and in particular, hectorite, montmorillonite, and synthetic mica have been studied the most as the offer improvements in mechanicals and barrier properties without sacrificing transparency. Numerous studies have focused on the barrier and mechanical performances of nanoclay-PET composites; however, very little improvement has been reported.

The modifiers used to improve the dispersion of smectite-type clays are not thermally stable at processing temperature of PET. The decomposition of these modifiers may lead to degradation of polymer matrix and inversely affect the mechanical and optical properties of the composite. As opposed to smectite-type clays, Kaolin is a layered aluminosilicate in which each layer in the structure comprises two sublayers: an alumina octahedral sheet and a silica tetrahedral sheet that share a common plane of oxygen atoms. Kaolin is extensively used in many industrial applications such as paper, ceramics, paint, rubber, and plastics industries. The asymmetric structure of the kaolin layers create large superposed dipoles and hydrogen bonds between the oxygen atoms on one side of each layer and the hydroxyl groups on the other side of adjacent layer leading to a large cohesive energy between the layers.

As a consequence of this cohesive energy, only some limited organic molecules can intercalate the space between the layers of kaolin. It is well known to those of ordinary skill on the methods and procedures on how to intercalate the space of kaolin layers. For example, imidazolium derivatives can be inserted within the kaolin layers via a melt reaction strategy. Additionally, other recent investigations include (1) the incorporation of organic modified kaolin in poly(vinyl pyrrolidone) via direct intercalation of the poly (vinyl pyrrolidone) into kaolin interlayer spaces at room temperature using a solution; (2) the intercalation of poly (styrene/maleic anhydride) into kaolin via in situ polymerization using kaolin-DMSO as a starting material; (3) creation of a PVC (polyvinylchloride)-kaolin nanocomposite via a solution method that expanded the interlamellar spaces by DMSO prior to intercalation of the PVC chains; (4) the intercalation of polystyrene into kaolin using a kaolin-DMSO intermediate; and (5) the preparation of kaolin-nylon 6 composites by the polymerization of 6-aminohexanoic acid (AHA) in the interlayer space of kaolin) and a commercial nylon 6 in a twin screw extruder). The results indicated that mechanical properties of the various polymer nanocomposites were improved over the polymers themselves.

SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

To overcome the above described problems in the prior polymer nanocomposite materials described above, and to overcome other limitations that will be apparent upon reading and understanding the present specification, aspects described herein are directed to PET nanocomposite materials that result in improved physical properties in the PET composite as a result of the intercalation of non smectite-type clay materials while simultaneously not impacting the transparency or barrier properties. Developing composite materials by addition of fillers to a PET polymeric matrix will improve many properties of the material. Fillers having a layered structure such as kaolin are desirable since they offer better improvements in mechanical and barrier properties without sacrificing transparency. Considering the specific structure of kaolin which leads to strong hydrogen bonding between the layers, modification of the particles seems to be unavoidable in order to improve their dispersion and make them more compatible with PET matrix. To reach this target, both mechanical (milling the particles) and chemical treatments are contemplated. In some aspects, kaolin particles are modified with inorganic molecules such as potassium acetate (KAc) to increase the interlamellar distances and improve the dispersion of kaolin particles. In other aspects, calcined kaolin particles are used. The calcined kaolin particles may be chemically treated, for example by an aqueous alcohol solutions method.

Any loss in the molecular weight of PET composite can be offset by the further incorporation of surface compatibilizers such as silane coupling agents and other process additives such as molecular chain extenders. In addition, by using an inorganic modifier such as KAc for chemical treatment, the PET nanocomposite is less prone to thermal degradation at the temperatures conventionally used for PET processing.

BRIEF DESCRIPTION OF THE DRAWINGS

A more complete understanding of the present invention and certain advantages thereof may be acquired by referring to the following detailed description in consideration with the accompanying drawings, in which.

DETAILED DESCRIPTION

Figure 1:
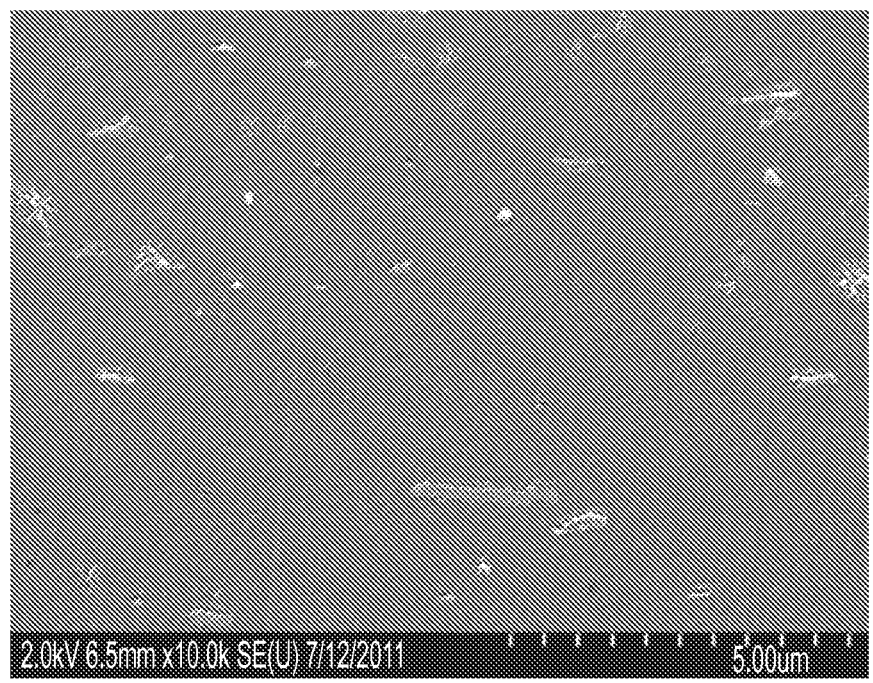
FIG. 1 shows an SEM micrograph of a kaolin-KAc PET nanocomposite.

Various examples and embodiments of the inventive subject matter disclosed here are possible and will be apparent to the person of ordinary skill in the art, given the benefit of this disclosure. In this disclosure reference to "some embodiments," "certain embodiments," "certain exemplary embodiments" and similar phrases each means that those embodiments are merely non-limiting examples of the inventive subject matter, and there are alternative embodiments which are not excluded. Unless otherwise indicated or unless otherwise clear from the context in which it is described, alternative and optional elements or features in any of the disclosed embodiments and examples are interchangeable with each other. That is, an element described in one embodiment or example should be understood to be interchangeable or substitutable for one or more corresponding but different elements in another described example or embodiment and, likewise, an optional feature of one embodiment or example may optionally also be used in other embodiments and examples. More generally, the elements and features of any disclosed example or embodiment should be understood to be disclosed generally for use with other aspects and other examples and embodiments. A reference to a component or ingredient being operative or configured to perform one or more specified functions, tasks and/or operations or the like, is intended to mean that it can perform such function(s), task(s) and/or operation(s) in at least certain embodiments, and may well be able to perform also one or more other functions, tasks and/or operations.

Nanocomposite PET containers for beverages or other substances can be made according to aspects of the present invention according to the following process steps: (1) physical treatment of kaolin; (2) chemical treatment of kaolin; (3) mixing of the treated kaolin with PET; and (4) formation of nanocomposite PET containers.

Physical Treatment of Kaolin

It is currently understood that mechanical treatment of kaolin can enhance the delamination process. Particularly, grinding as a mechanical treatment can lead to significant changes in the structure of kaolin, including increased delamination and/or substitution of OH groups by water molecules. Physical grinding of kaolin markedly affects its crystalline structure regardless of chemical treatments. Grinding can simultaneously destroy the crystalline structure of kaolin and change the particle size distribution, thereby increasing the number of hydroxyl groups on the surface of the kaolin particles. This increased number of hydroxyl groups makes the kaolin particles more hydrophilic and augments the water adsorption on the surface. Despite the fact that grinding decreases the total amount of hydroxyl groups in the bulk of the material, the fracture and delamination of particles from physical grinding increases the number of hydroxyl surface groups thus facilitating the adsorption of water when the physically modified kaolin is exposed to normal atmospheric conditions. The facilitation of water adsorption generally adversely affects continued processing of the kaolin.

Methods of physical grinding pure or chemically treated kaolin are well known to those of ordinary skill. Generally, any known method of physically grinding clays can be used. Numerous pieces of equipment for physically grinding clays, such as the Shatterbox Laboratory Mill, Model 8510, from SPEX SamplePrep, LLC are commercially available. The standard operating conditions of this particular piece of equipment are standard room temperature and pressure. The physical grinding of the kaolin may be performed under the standard operating of the equipment for a period sufficient to reach a surface area of about 20-100 $m^2/g$ and a mean particle size of less than about 100 μm. In some cases, the physical grinding of the kaolin is performed under the standard operating conditions of the equipment for a period of time sufficient to reach a surface area of about 30-80 $m^2/g$ or about 40-70 $m^2/g$ and a mean particle size of less than about 80 μm, and in some cases less than about 70 μm, less than about 50 μm, or less than about 30 μm.

Chemical Treatment of Kaolin

In order to improve the desired mechanical performance of the resulting PET composite, a chemical treatment procedure using inorganic systems such as potassium acetate (KAc) has been developed to improve the dispersion of kaolin particles and the thermal stability of nanocomposite up to temperatures higher than processing temperature of PET. In other aspects, kaolin may be chemically treating using an aqueous alcohol solutions method. Chemical treatment of kaolin can expand the distances between the alumina sheets of kaolin so as to facilitate later intercalation of PET within the chemically treated kaolin. One particularly suitable material for chemically treating kaolin according to one or more aspects of the current invention is potassium acetate (KAc). KAc chemical treatment is currently believed to provide for this expansion of the alumina sheets due to the formation of strong hydrogen bonds between the acetate ions of the potassium acetate and the inner surface hydroxyl groups of the kaolin. Additionally, it is currently believed that the presence of water molecules facilitates formation of water KAc complexes that additionally affect the electrostatic interactions between the acetate and hydroxyl ions and the physical orientation of the KAc in between the alumina layers of the kaolin (e.g., potentially inclined or perpendicular) thus causing increased amounts of expansion of the kaolin from use of this chemical treatment.

In one or more aspects of this invention, physically modified kaolin is treated with KAc to create a kaolin-potassium acetate precursor by intercalation of kaolin with KAc. KAc is capable of penetrating between the layers and expanding the structure of kaolin. Generally, this step includes the treatment of kaolin with a KAc solution to create a kaolin-KAc precursor. In one embodiment, physically modified kaolin is generally mixed with a water solution of KAc at room temperature using standard mixing equipment well known to those of ordinary skill in the art for a time period sufficient to intercalated KAc into the physically modified kaolin. The time period sufficient to intercalate KAc into the physically modified kaolin ranges from about 12 to about 48 h. at standard room temperatures and pressures. Often the weight ratio of physically modified kaolin to KAc to water mixed in this step is from about 1:0.3:2 to about 1:2:3. After mixing, the treated kaolin may be physically separated from the solution and dried to remove any remaining KAc and water. The separation of the treated kaolin from the remaining solution can be accomplished using standard commercial separation and drying equipment at conditions readily apparent to those of ordinary skill. In other embodiments, kaolin is first subjected to a chemical treatment with KAc followed by a step of physical modification as previously described.

Mixing Treated Kaolin with PET

After the intercalation of the kaolin with KAc or other chemical treatment as described above, the PET resin is more easily intercalated throughout the kaolin than is possible without either or both of the above physical and chemical treatments. In one aspect, the PET resin can be directly intercalated through interaction with the kaolin-KAc precursor. In other aspects, the dispersion of the kaolin throughout the PET substrate is substantially enhanced through the creation of an intermediary concentrated master batch in which some or all of the KAc is replaced with other suitable inorganic or organic modifier(s).

Intercalation of the PET chains within the treated kaolin may be accomplished by displacing the intercalated KAc with PET through the blending of PET and kaolin-KAc. Generally the blending of these components can be accomplished using commercially available equipment operating at readily discernible parameters known to those of ordinary skill. In some embodiments, a PET fine powder is used as the source of PET. A PET fine powder can generally be obtained by taking commercially available PET particles and grinding them in a liquid nitrogen environment using commercially available equipment at readily discernible operating parameters for those of ordinary skill. For example, the PET fine powder may be obtained by immersing the PET pellets in liquid nitrogen for 3-6 minutes and immediately grind them for 2-3 minutes using a One-Gallon 3.75 HP Blender from Waring Comercial®. The resultant PET fine powder and kaolin-KAc are then dried for a sufficient amount of time and at a sufficient temperature to remove excess moisture before mixing. In some aspects, the resulting mix will have a uniform dispersion of the PET fine powder. Generally the weight ratio of PET fine powder mixed with the kaolin-KAc is from about 2.5 to about 9. The resulting mixture was melt-blended by extrusion using commercially equipment at temperatures and speeds within the normal operating parameters of the equipment and easily discernible to one of ordinary skill to yield a kaolin nanocomposite PET structure master batch composite that can be admixed with neat PET in addition with other optional components to obtain a kaolin nanocomposite PET structure with desired filler loadings according to an embodiment. In other embodiments, the proportions of the components of the above described melt blending can be modified to achieve a kaolin nanocomposite PET structure with desired filler loadings. In order to achieve one or more advantages identified herein, the kaolin-KAc and neat PET may be admixed in appropriate proportional amounts so as to achieve a resulting kaolin nanocomposite PET structure has an increased elastic modulus as compared to PET while maintaining the approximate equivalent optical quality. Usually the increase in elastic modulus is over 40% as compared to PET without any significant adverse effect on optical quality. In some cases, the increase in elastic modulus is over 50% as compared to PET without any significant adverse effect on optical quality. Generally, the above improvement in elastic modulus and decreased weight can be achieved with a filler loading weight percent from about 1 to about 10. Usually, this filler loading weight percent is from about 2 to about 8. More often, this filler loading weight percent is from about 2 to about 5.

In addition to the nanocomposite filler, other components may be optionally added to the PET to (1) further enhance the desired physical properties of the nanocomposite PET, (2) offset any degradation in desired physical properties of the nanocomposite PET, or (3) added other desired physical properties to the nanocomposite PET. These optional components such as coupling agents, surface compatibilizers and molecular chain extenders, as well as the amounts and methods of inclusion with PET are well known to those of ordinary skill as many of these optional components are currently in use in ongoing commercial applications. For example, it is currently believed that the addition of the kaolin particles to the PET matrix may reduce the molecular weight and viscosity of the resulting nanocomposite PET blend. As is well known to those of ordinary skill, PET is very sensitive to processing conditions and due to the thermo mechanical degradation of polymer chains and concomitant viscosity loss during the melt processing the mechanical properties of the composite can be adversely affected by decreased molecular weight and viscosity of the nanocomposite PET. Inclusion of small amounts, generally 0.1-1 wt %, of well-known chain extenders such as Joncryl® Chain Extenders from BASF Corporation to the PET component prior to processing can minimize these adverse effects. Additionally, it is believed that the onset temperature of degradation and temperature of maximum mass loss are lowered with the use of treated kaolin particles in PET. Adjustment of the nanocomposite PET blend by addition of known optional components can offset or reduce these affects.

As optical properties such as transparency are one of the most important factors which influence the quality of a packaging system, care must be utilized in the incorporation of fillers within the PET structure. The incorporation of fillers to a polymer can usually impair the optical properties such as haze and clarity. The difference in the refractive indices of the matrix and dispersed phase or Rayleigh scattering of the particles smaller than the light wavelength can cause haziness in transparent polymers. Therefore, the number and size of the dispersed particles, including treated kaolin and optional surface compatibilizers and molecular chain extenders can adversely affect the transparency of PET. It is well known to those of ordinary skill that haze increases with filler content and that use of the optional chain extender leads to higher haze values. It is equally well known to those of ordinary skill that the effect chain extenders have on transparency is more pronounced when the composite in question also included silane-treated particles. Depending on the desired haze of the PET, it is easily discernible to one of ordinary skill on how to modify the proportionalities of treated kaolin fillers, and other optional components that can be added to PET so as to not exceed the desired haze while maintaining the other desired properties obtained.

Formation of Nanocomposite PET Containers

In accordance with aspects, nanocomposite PET containers can be produced using process well known to those of ordinary skill in the art at generally the conditions traditional PET containers can be produced. For example, traditional PET containers can be produced through die extrusion and blow molding techniques. Variations of the extrusion parameters, operating conditions, and optional equipment used in the production techniques of traditional PET containers can also be applied to the production of the nanocomposite PET containers according to one aspect. For example, variations in the drawing speed of the PET film can alter the thickness of a traditional PET container produced through well-known extrusion processes. Similarly, variations of the drawing speed of the nanocomposite PET film according to one aspect can yield a container with differing thicknesses.

Alternatively, certain aspects of the present invention use other known PET processing techniques to produce PET containers. For example one of ordinary skill can also use in-situ polymerization processes to synthesize PET/kaolin composites under easily discernible operating parameters. In-situ polymerization consists of a two-stage synthesis process—esterification reaction and polycondensation reaction. Appropriate amounts of modified kaolin particles can be added during either of the above mentioned two stages without significantly varying the operating parameters associated with traditional PET processing. In some aspects, the containers are transparent. In some aspects, the containers are carbonated soft drink (CSD) containers.

The following example of a specific embodiment of one or more aspects described herein and is not intended to limit the spirit or scope of the present invention.

EXAMPLE 1

Kaolin Nanocomposite PET Structure

The starting materials used in the process of making a PET structure according to one embodiment include a bottle grade PET resin and commercial kaolin clay. Particularly in this example, a bottle grade polyethylene terephthalate (PET) resin Laser+®-7000 with an intrinsic viscosity of 0.84 dL/g, a melting point of 242° C. and 35% crystallinity was used. This bottle grade PET is commercially available from DAK Americas LLC. The commercial kaolin, hydrous aluminosilicate used in the present example has a density of 2.58 g/cm3 at 25° C. with a particle size of (D90<2 μm). This commercial kaolin is commercially available from BASF Corporation. Other materials used in the present example include (1) potassium acetate (KAc), (2) 3-aminopropyl triethoxysilane, and (3) PET chain extender (30 wt/%). All of these chemicals are commercially available. KAc is available from Sigma-Aldrich, and 3-aminopropyl triethoxysilane is available from Acros Organics. A PET chain extender (30 wt %), available from Polyvel Inc., was used to raise the intrinsic viscosity and increase the melt strength of the PET resin during the melt blending.

The resulting intercalated kaolin was then ground by a Shatterbox Laboratory Mill (Model 8510, commercially available from SPEX SamplePrep, LLC) for 3-4 min to obtain particles in the range of 10-20 micron.

A PET fine powder used in one embodiment was prepared by taking commercially available PET pellets and grinding them in a liquid nitrogen environment to obtain the PET fine powder. The PET pellets were immersed in liquid nitrogen for 3-6 minutes and immediately ground for 2-3 minutes using an One-Gallon 3.75 HP Blender from Waring Comercial®.

The PET fine powder and kaolin-KAc were dried in a vacuum oven at about 110° C. for about 24 hours to remove moisture. The PET fine powder was then admixed with the kaolin-KAc (the weight ratio of PET fine powder to kaolin-KAc was 0.5) until uniformly dispersed. The resulting mixture was melt-blended by extrusion using a twin screw extruder (available for LEISTRITZ Extruder Corp., with a L/D ratio of 40) at a temperature from about 250 to about 275° C. and a screw rotating speed of about 150 rpm to obtain a 20 wt % masterbatch composite. The masterbatch composite was then diluted with neat PET (the weight ratio of neat PET to the masterbatch was 19) to yield a kaolin nanocomposite PET structure with desired filler loadings. FIG. 1 shows an SEM micrograph of the kaolin-KAc PET nanocomposite.

EXAMPLE 2

Calcined Kaolin Nanocomposite PET Structure

A commercial grade PET resin (Laser+® 7000) with an intrinsic viscosity of 0.84 dL/g provided by DAK Americas LLC was used as a polymer matrix. A commercial calcined grade kaolin (Ultrex® 96) from BASF Corporation was used. It is a dehydroxylated aluminosilicate with a density of 2.63 g/cm$^3$ (at 25° C.) and an average particle size of 1.2 μm. In order to raise the melt viscosity and molecular weight of the PET resin, an FDA-approved masterbatch of PET with a chain extender from Polyvel Inc., was added during the melt mixing. A silane coupling agent, 3-(glycidoxy-propyl)trimethoxysilane supplied by Gelest was used for silanization of the surface of particles.

A Hitachi S4700 SEM instrument with a cold field emission gun under an acceleration voltage of 2 kV was used to examine the morphological characteristics of the composites. The samples were microtomed using an Ultracut FC microtome (Leica, Germany) with a diamond knife and gold coating was subsequently applied to make them conductive.

The structure and crystal size of the composites were investigated by wide angle X-Ray diffraction (WAXD). The WXRD patterns were recorded over scattering angles, 2θ, range from 10 to 40° on a Philips X'pert diffractometer (CuKα radiation, λ=1.54056 A°) operating at a voltage of 50 kV and current of 40 mA.

Rheological measurements were carried out under nitrogen atmosphere on a stress-controlled rheometer (Bohlin Gemini HR nano, Malvern) with a parallel plate geometry using 25 mm diameter plates and 1 mm gap size. The rheometer was equipped with a convection oven to control the temperature at 270° C. for all the samples.

Melting and crystallization characteristics of the samples were determined by differential scanning calorimetry (DSC) using a DSCQ1000 TA Instrument at a heating/cooling rate of 10° C./min under helium atmosphere. Thermal gravimetric analysis (TGA) was carried out on a TGA500 TA Instrument. About 10 mg of the samples were heated at 10° C./min from 30 to 700° C. under nitrogen atmosphere.

The mechanical properties were measured in tensile mode at room temperature using an Instron universal testing machine (Model 3365) with 500 N load-cell at a strain rate of 25 mm/min.

In order to determine barrier properties of the composites, oxygen transmission rates (OTRs) were measured at 23° C. under a barometric pressure 700 mmHg using an Ox-Tran oxygen permeability MD Module (Model 2/21) from Mocon. The permeability coefficients were calculated by normalizing (multiplying) measured OTR values by the films thickness. Haze values were determined according to ASTM D1003 using a LAMBDA 1050 spectrophotometers from PerkinElmer.

The calcined kaolin ("CKao") particles were modified via aqueous alcohol solutions method. An ethanol-deionized water (90/10 wt %) solution was adjusted to pH 4.5-5.5 with acetic acid. The required amount of silane coupling agent was added drop wise to yield a 4% final concentration and the mixture was stirred for 10 min for hydrolysis and silanol formation. Then, the temperature was increased to at 80° C., calcined kaolin particles were added into the solution and the grafting reaction was completed under stirring for 2 hr. The product was filtered and extensively washed with ethanol in order to remove the excess silane and finally dried at 50° C. in a vacuum oven.

A PET-calcined kaolin composite was prepared as follows. A PET powder (PET granules were ground in liquid nitrogen to obtain a fine powder of PET) was manually mixed with the calcined kaolin for a few minutes and then the mixture was melt-blended via a twin screw extruder (LEISTRITZ Extruder Corp., L/D=40) to obtain a 20 wt % masterbatch. The temperature profile was set in the range of 250-275° C. and the screw rotating speed was 150 rpm. The masterbatch was eventually diluted with neat PET and the final films with 2-8 wt % filler content were prepared via cast film extrusion process. Unless otherwise indicated, for all the composites, the filler loading was 2 wt % and PET-calcined kaolin composite contained 0.5 wt % chain extender. Prior to processing, all the materials were dried in a vacuum oven at 110° C. for 24 h to eliminate the moisture and prevent hydrolysis reactions during the melt compounding.

Uniaxial stretching of the composites was then carried out. Rectangular PET sheets having 10 cm wide, 40 mm long and 100 μm thick, cut from the extruded films, were uniaxially stretched in an Instron mechanical testing machine (ElectroPuls™ E3000) equipped with an environmental chamber. The stretching temperature was set in the range of 90 to 120° C. and specimens were strained up to draw ratios of 2 to 4 and rapidly cooled down to room temperature with air flow.

Figure 2:
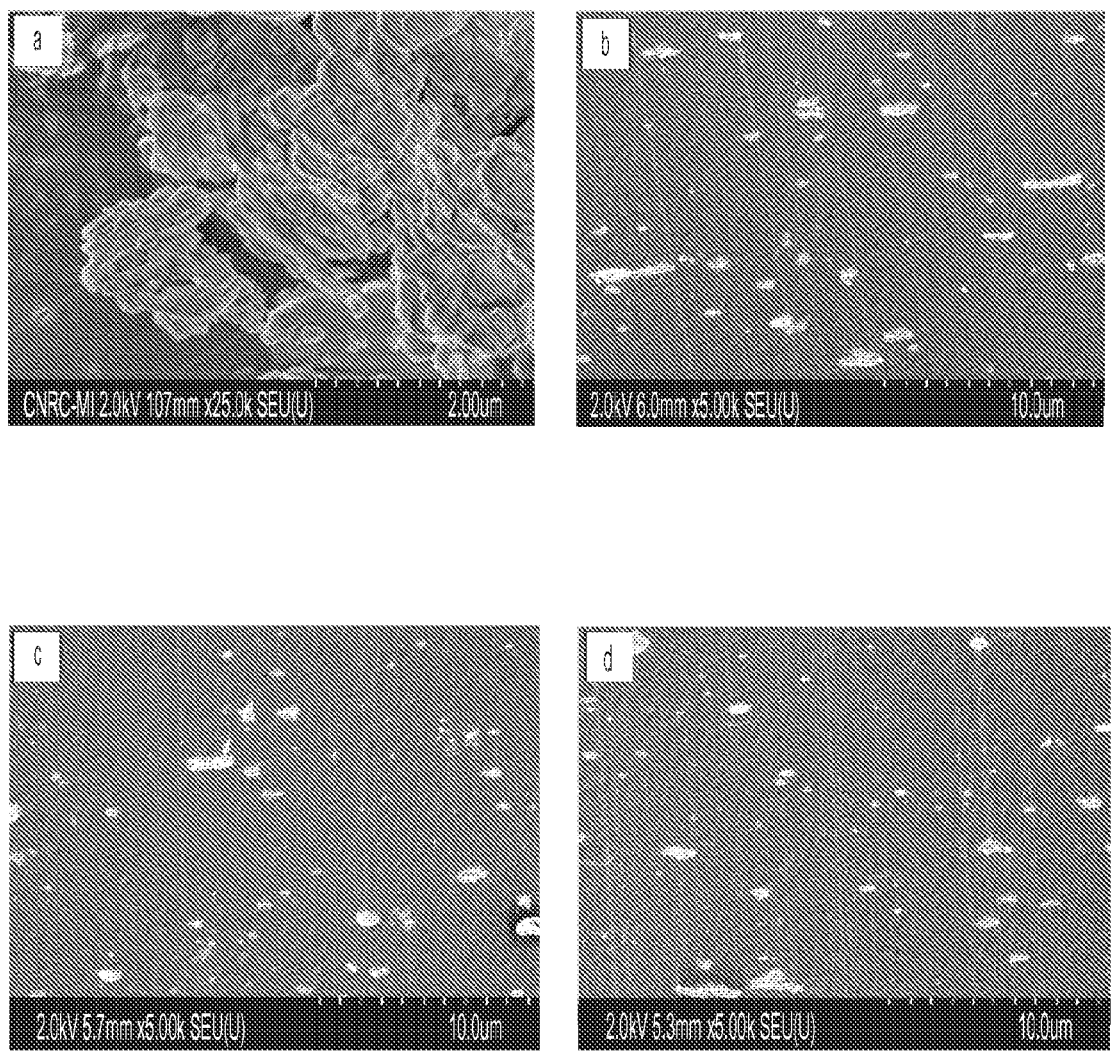
FIG. 2 provides SEM micrographs of (a) Neat PET, (b) PET-CKao, (c) PET-CKao-SiE, and (d) PET-CKao-ch.

FIG. 2 shows SEM images of as-received calcined kaolin ("CKao"), the PET-calcined kaolin composite ("PET-CKao"), the PET-calcined kaolin composite treated with silane coupling agent ("PET-CKao-SiE"), and the PET-calcined kaolin composite containing a small amount of chain extender ("PET-CKao-ch"). The as-received kaolin has a layered structure (FIG. 2a). During the calcination process at high temperatures, dehydroxylation occurs, the layers collapse, and a tightly-stacked structure is formed. However, this process does not change the layered structure of the material. After blending with PET, large CKao aggregates break up to form smaller particles (<1 μm) uniformly dispersed in the matrix (FIG. 2b). However, very few particles in the range of 2-3 μm could be still observed in the image. It seems that the silane treatment and addition of chain extender has a small effect on the morphology of composites as well. The size of dispersed particles is slightly smaller in the case of samples treated with silane coupling agent (FIG. 2c) or those containing a small amount of chain extender (FIG. 2d). The chain extender can react with the end groups of PET chains and provide a chemical link between them, so increases molecular weight and subsequently the viscosity of PET during the melt process. Due to increased viscosity, the particles in the extruder will undergo a higher shear field which promotes the breaking of particles and results in a smaller particle size.

Figure 3:
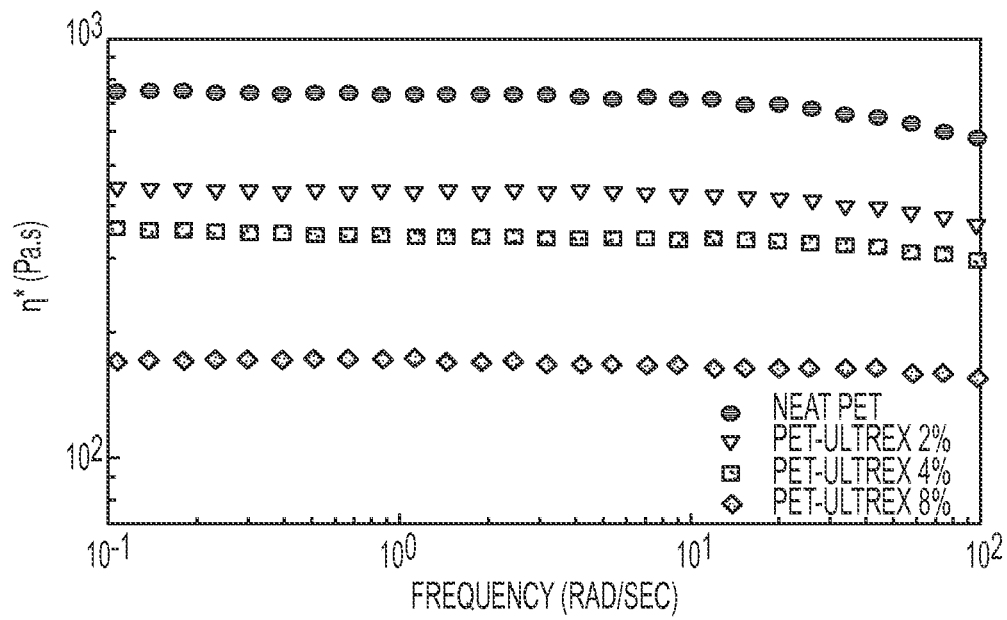
FIG. 3 shows complex viscosity of Neat PET and PET-CKao composites.

The rheological properties of neat PET and PET-CKao with different filler loadings are presented in FIG. 3. From frequency sweep measurements, one can clearly see that PET and its composites show a Newtonian behavior in most of the frequency range examined. At high frequencies, the viscosity becomes slightly shear thinning. The constant melt viscosity at low frequencies is known as the zero shear viscosity and is proportional to molecular weight of a polymer to the power. Filled PET generally shows a complex viscosity lower than that of neat PET and increasing the filler loading results in even lower viscosities. This effect suggests that the presence of calcined kaolin particles intensify the degradation of PET chains, which lowers the molecular weight and the melt viscosity of samples.

Figure 4:
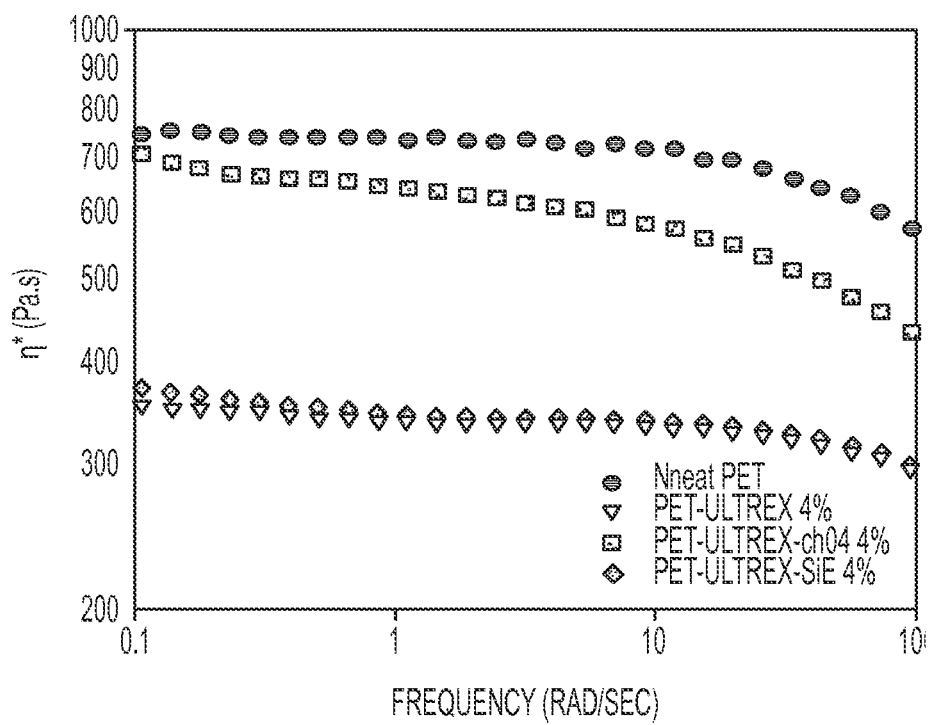
FIG. 4 illustrates the effect of a chain extender and silane coupling agent on the melt viscosity of PET-CKao composites.

FIG. 4 depicts the effect of chain extender and silane coupling agent on the viscosity of the samples, in particular the frequency ($\omega$) dependence of the complex viscosity ($\eta^*$) for PET-CKao, PET-CKao-ch, and PET-CKao-SiE composites with 4 wt % of filler. Modification of CKao with silane coupling agent did not seem to have a significant effect on the rheological properties of PET. However, the composite containing the chain extender displayed higher viscosity and a pronounced shear thinning behavior. The chain extender acts as a bridge connecting the polymer chains and increases the molecular weight of PET. Thus, the shear thinning behavior could be due to the formation of long chain branches and broadening of the molecular weight distribution of PET because of the possible reactions with the chain extender. Long chain branching develops an entanglement network that confine the mobility of the polymer chains and consequently affect the rheological behavior of PET.

Table 1 below shows DSC data of neat PET and PET-CKao composites (second heating).

TABLE 1

| Samples | $T_g$ (° C.) | Cold crystallization | | Melting | | $T_c$ (° C.) | $X_c$ (%) |
|---|---|---|---|---|---|---|---|
| | | $T_{cc}$ (° C.) | $\Delta H_{cc}$ (J/g) | $T_m$ (° C.) | $\Delta H_m$ (J/g) | | |
| Neat PET | 78.9 | 134.8 | 22.5 | 245.3 | 32.6 | 180.7 | 7.2 |
| PET-CKao (2 wt %) | 78.4 | 132.0 | 3.8 | 247.0 | 36.4 | 201.5 | 23.5 |
| PET-CKao-ch (2 wt %) | 76.1 | 135.9 | 19.8 | 243.6 | 30.1 | 187.2 | 7.4 |
| PET-CKao-SiE (2 wt %) | 75.8 | 134.2 | 19.8 | 245.2 | 34.2 | 190.7 | 10.4 |

As can be seen in Table 1, neat PET and PET-CKao composites exhibit non-isothermal DSC data. Melting temperature ($T_m$) and glass-transition temperature ($T_g$) of the composites remains approximately the same regardless of CKao incorporation. However, crystallization temperature ($T_c$) shifted to higher temperatures, which is attributed to the nucleating effect of CKao particles. Furthermore, this effect results in higher crystallinity ($X_c$) in the composites. It is also shown that addition of a chain extender has a hindering effect on the crystallization of PET matrix, as is revealed by the decrease in the crystallization temperature. Apparently, chain extender molecules can act as branching point and cause difficulty for chains mobility and their rearrangement in the crystalline structure. The data presented in Table 1 also show that silane modification has a similar effect on the crystallization behavior of PET. It seems that the silane coupling agent molecules cover the particles, obstructing the migration and diffusion of PET chains to the surface of the CKao (as nucleus).

Figure 5A:
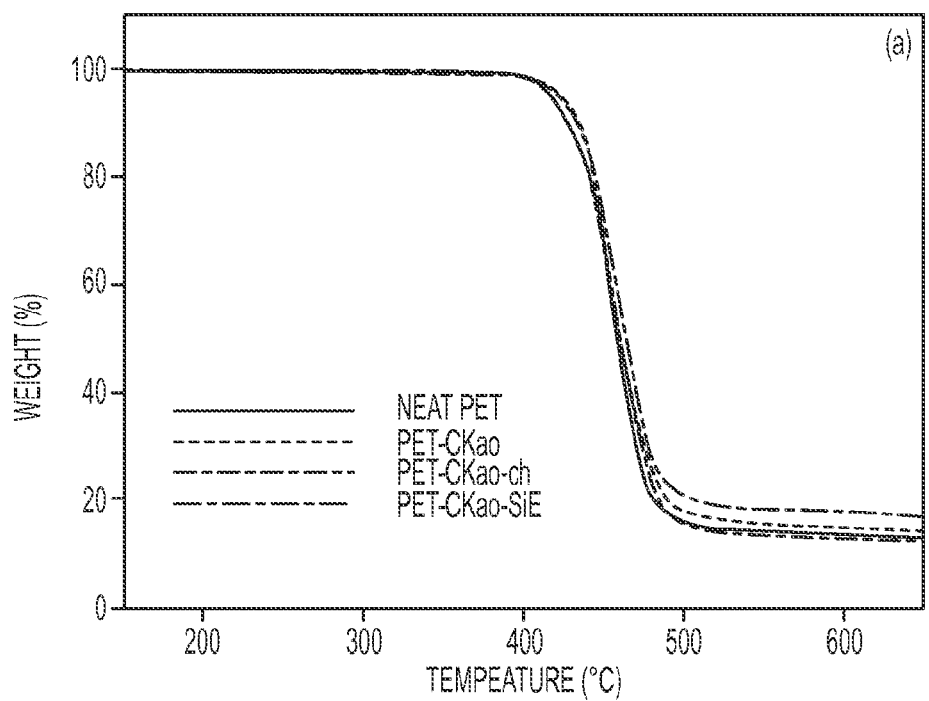
FIGS. 5a-5b show TGA data for PET and PET-CKao composites with 2 wt % filler content under nitrogen atmosphere at heating rate 10° C./min: (a) weight loss, (b) derivative weight loss.
Figure 5B:
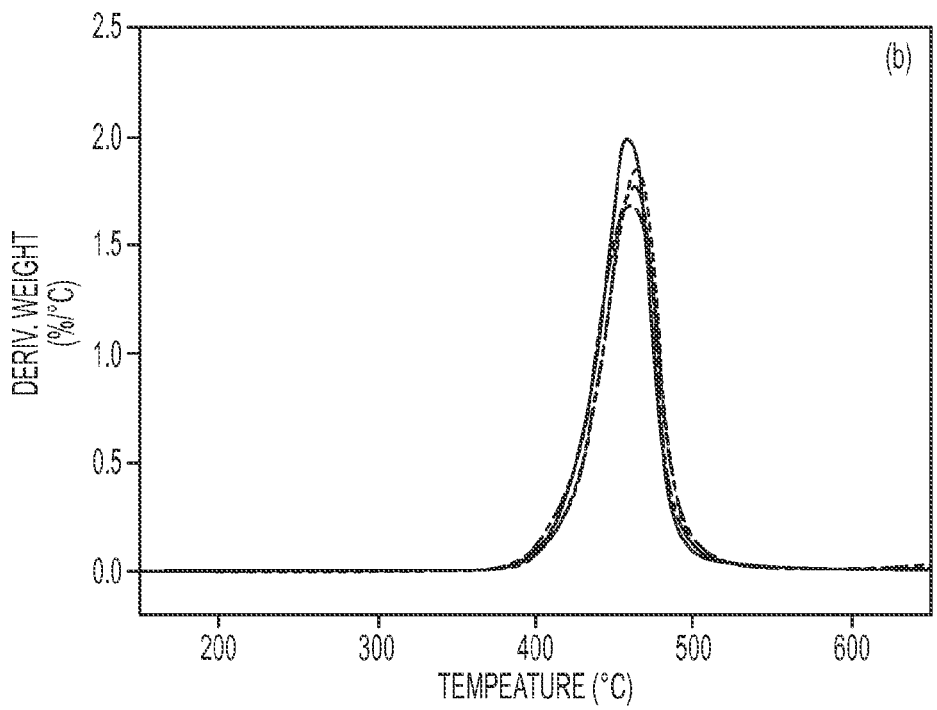

Thermal stability of neat PET and the composites under inert atmosphere (nitrogen) was investigated by thermogravimetric analysis ("TGA") and the results are presented in FIGS. 5a-5b, with FIGS. 5a-5b presenting TGA data for PET and PET-CKao composites with 2 wt % filler content under nitrogen atmosphere at heating rate 10° C./min: (a) weight loss, (b) derivative weight loss. A single decomposition step was observed for all samples. The decomposition of neat PET started around 390° C. and an identical temperature was observed for all the composites. However, for the composites the temperature of maximum decomposition rate ($T_{d,max}$) is slightly increased (by 4-7° C.) compared to that of neat polymer. These results suggest that the incorporation of CKao can slightly enhance the thermal stability of PET.

Figure 6A:
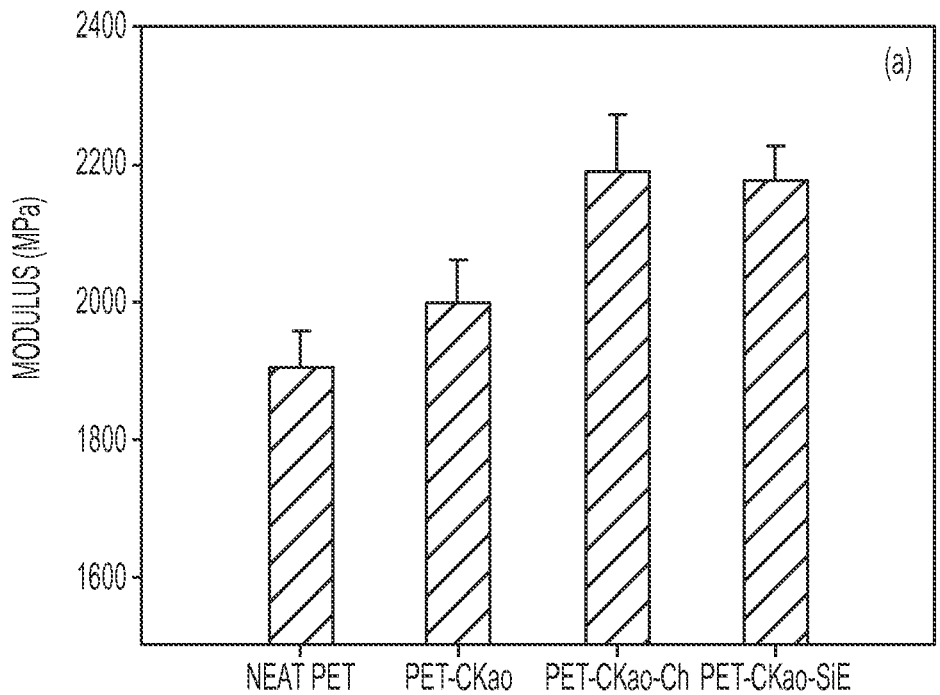
FIGS. 6a and 6b show the effect of silane coupling agent and chain extender on modulus and elongation at break, respectively, of PET-CKao composites with 2 wt % filler content.
Figure 6B:
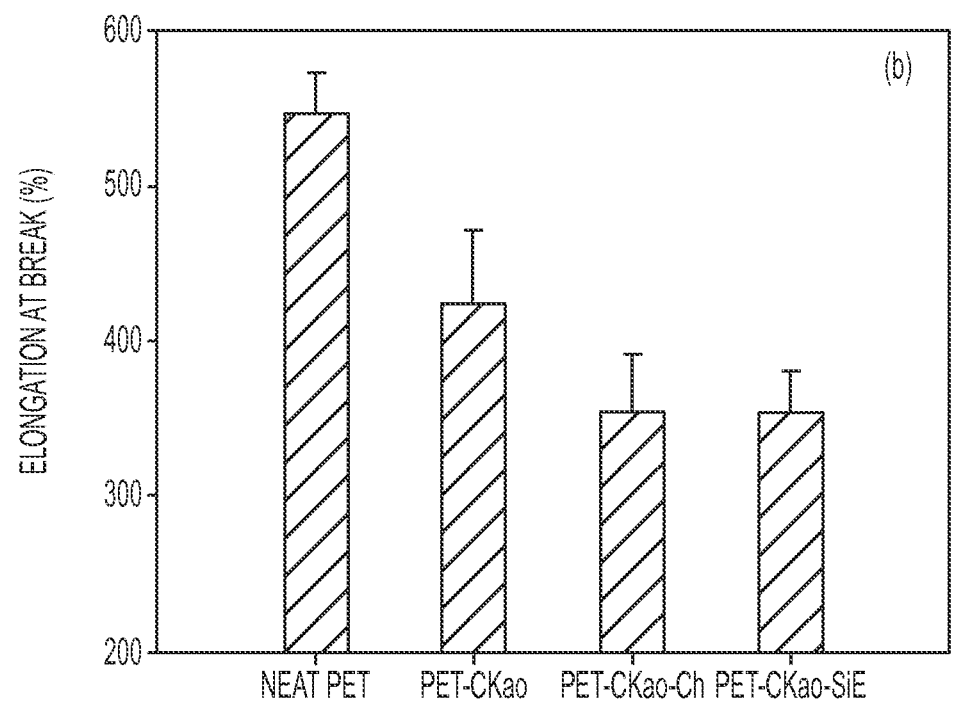

FIGS. 6a and 6b show tensile properties of neat PET and PET-CKao composites. For neat PET, the tensile modulus was 1930 MPa and with the addition of 2 wt % CKao, the modulus raised to 2050 MPa. It is well known that filler particles can diminish polymer chain mobility, resulting in less flexibility and higher modulus. The improvement of modulus was more pronounced for the PET-CKao-SiE composite. Silane treatment provides a stronger interaction (chemical bonds) between PET molecules and filler particles, and thus results in better stress transfer and more enhancement of modulus. It is also shown that addition of a chain extender has a reinforcing effect on the tensile properties of the composite, probably due to the increased molecular weight and formation of a long chain branching structure. On the other hand, the incorporation of CKao particles had an adverse influence on ductility of samples, thus the increment in modulus was accompanied with 130% and 200% decrease in the elongation at break of PET-CKao and PET-CKao-SiE, respectively, compared to that of neat PET (FIG. 6b). Similar observation have been previously reported for other polymer/clay composites such as epoxy/organoclay, PLA/MMT, and PET/MMT.

Figure 7A:
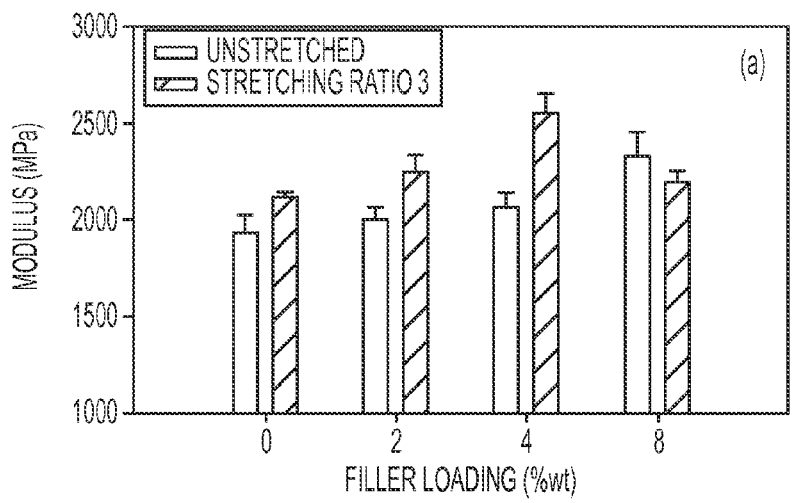
FIG. 7 shows the tensile modulus of neat PET and PET-CKao composites: (a) effect of filler loading, (b) effect of stretching temperature, and (c) effect of stretching ratio.

FIG. 7 shows the modulus of stretched and unstretched neat PET and PET-CKao composites with different filler content. The results show that, in case of unstretched samples, modulus increases gradually as filler loading increases from 0 to 8 wt %. However, this effect was more remarkable at higher filler contents. This improvement in Young's modulus can be attributed to the reinforcing effect of CKao particles dispersed in the PET matrix.

Figure 8A:
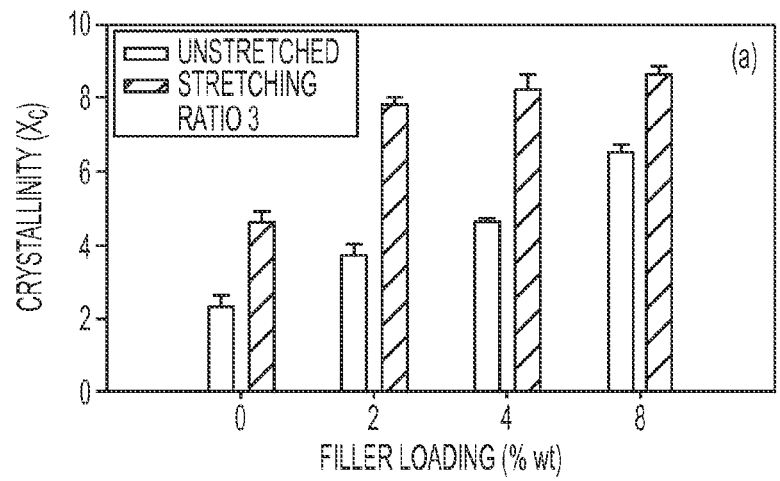
FIG. 8 presents the relative crystallinity of neat PET and PET-CKao composites: (a) effect of filler loading, (b) effect of stretching temperature, and (c) effect of stretching ratio.
Figure 8B:
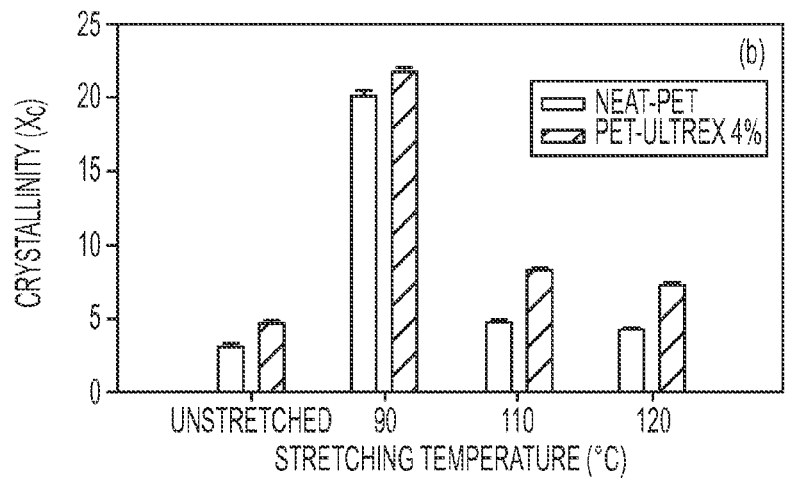
Figure 8C:
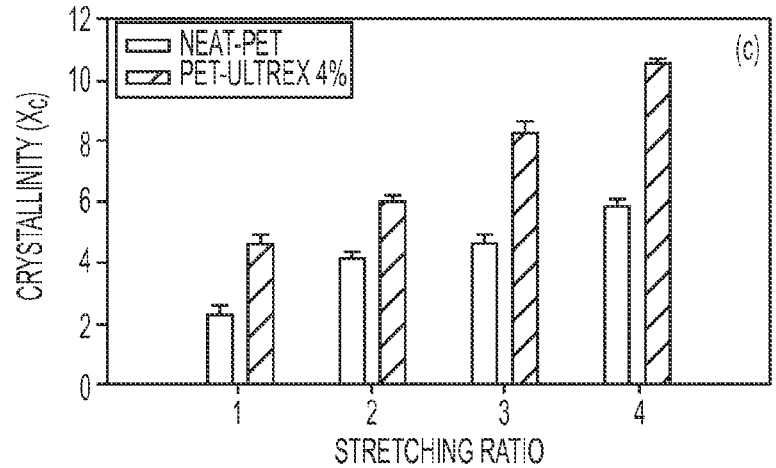

Two main parameters are considered to have the greatest influence on the mechanical properties of composite materials; the incorporation of particles which have relatively higher elastic modulus compared to polymer matrix and the relative crystallinity of the samples, since the crystalline domains act as high stiffness domains. The crystallinity of neat PET and PET-CKao composites was determined by DSC and are displayed in FIG. 8. It is shown that the crystallinity of unstretched PET-CKao composites increases with filler content, however, it does not change after being stretched (FIG. 8a).

For composites with the same filler content, hot-stretched ones have significantly higher tensile modulus. This is attributed to the increased molecular orientation and strain-induced crystallization of the PET chains during the stretching process. The only exception to this is the composite with 8 wt % of CKao. One should note that, during the melt mixing of samples with higher filler contents, formation of aggregates occurs which can significantly decrease the specific surface area of the filler and deteriorate filler-matrix adhesion. Moreover, this can negatively affect the wetting of filler by polymer matrix which subsequently gives rise to development of voids and micro-cracks in the composite. The vicinity of these voids and flaws are considered as stress concentration points that impair the effective load transfer through the interface between the matrix and the filler. In contrast to stretched samples, this phenomenon is not significant in the case of unstretched films, because the stretched samples have already undergone a debonding between the phases during the hot-stretching step.

Figure 7B:
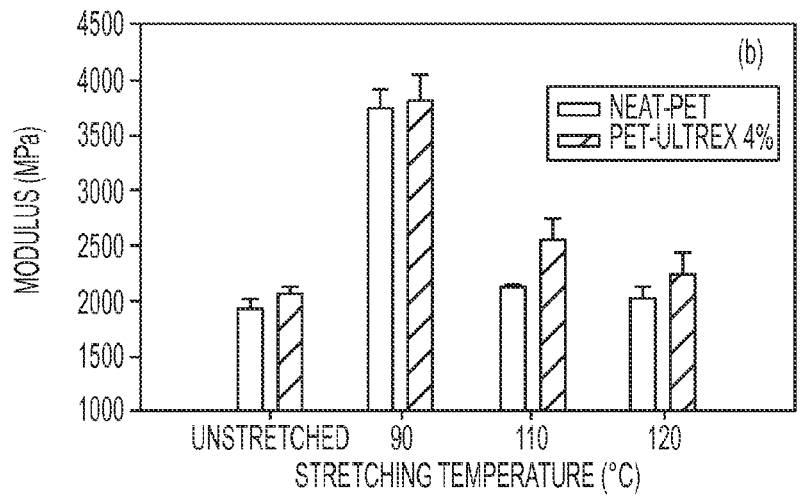

FIG. 7b shows the effect of stretching temperature on tensile modulus of neat PET and PET composites. It can be clearly observed that, for both neat and filled PET, samples stretched at lower temperatures have significantly higher modulus which could be assigned to the effect of crystals formed during the stretching and higher orientation developed at lower stretching temperatures. As presented in FIG. 8b, the relative crystallinity of composite stretched at 90° C. is much higher than unstretched ones or those stretched at 110° C.

Figure 9A:
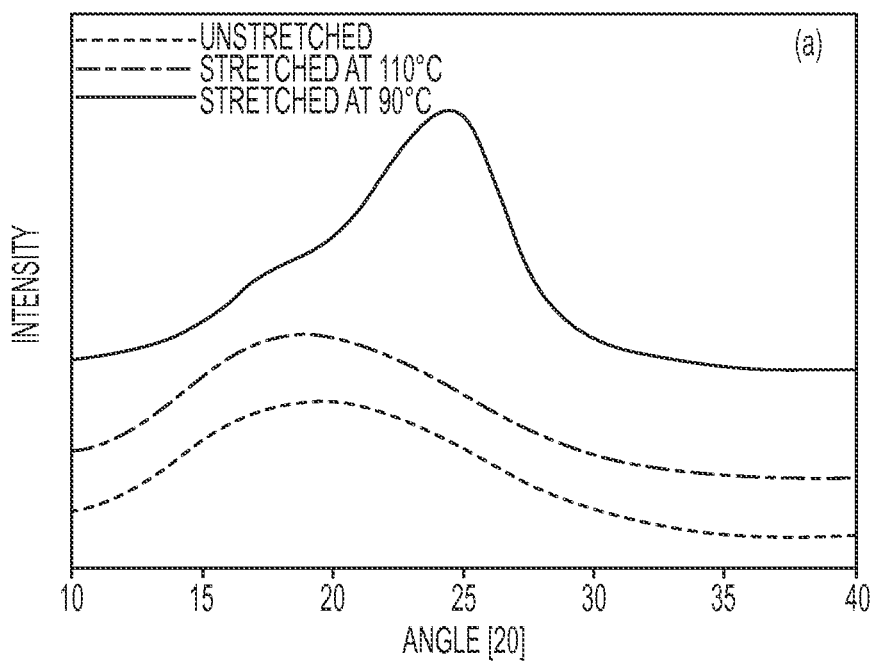
FIGS. 9a and 9b show XRD patterns of neat PET and PET-CKao4%, respectively. Stretching ratio was 4 for both samples.
Figure 9B:
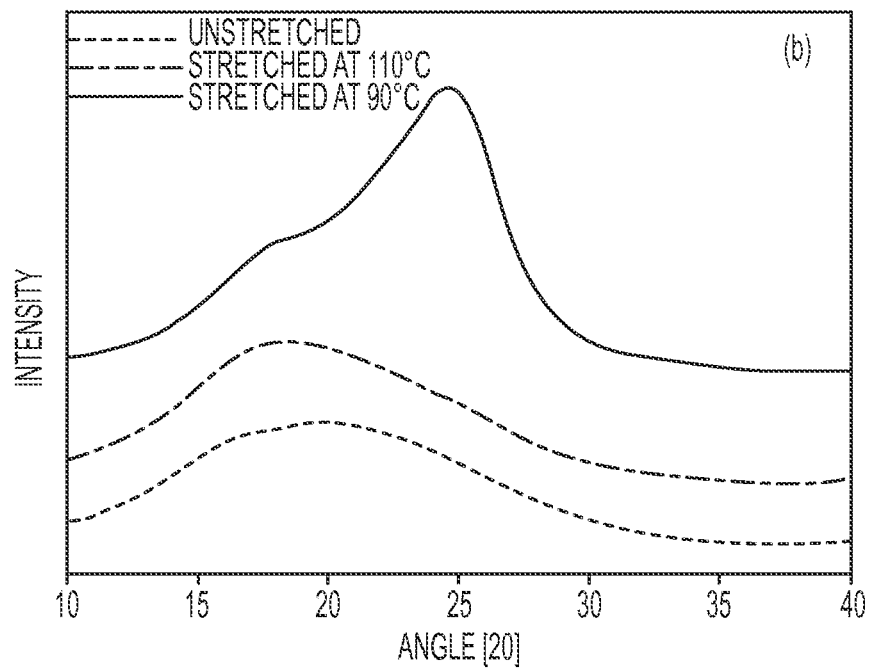

The wide-angle X-ray diffraction patterns for the neat PET and the 4 wt % calcined kaolin filled composites are displayed in FIGS. 9a and 9b, respectively. A characteristic diffraction pattern of PET is generally broad and composed of the amorphous phase and reflections of the crystalline phase. The diffractogram of samples stretched at 90° C. shows a diffraction pattern with a new single peak centered on $2\theta=250$ indicating the formation of the crystalline phase in the samples due to molecular orientation and crystallization during the stretching process. The molecular orientation gives rise to a narrow distribution of both the amorphous and the crystalline phase. In case of unstretched samples and those stretched at high temperatures (110° C.) the diffractogram displays a very broad peak centered around $2\theta=20°$. This is characteristic of glassy PET and is attributed to the amorphous phase. It is also noticeable that the crystalline phase is formed for all samples stretched at 90° C. regardless of the addition of CKao.

Figure 7C:
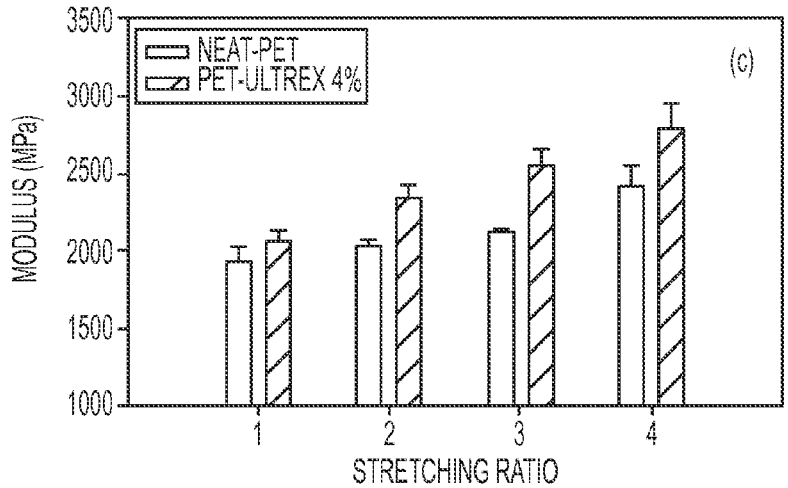

The effect of stretching ratio on tensile modulus is displayed in FIG. 7c. One can see that for both neat PET and PET-CKao modulus is increased by stretching ratio. This is assigned to the increased orientation of PET chains and strain-induced crystallization at higher stretching ratios. In all cases, stretched PET-CKao films have higher modulus compared to stretched neat PET. More improvement in the modulus of PET-CKao, compared to neat PET, is likely to be a result of combined effect of incorporation of CKao particles and enhanced crystallinity (due to the particles, as shown in FIG. 6). This could be due to the better alignment of filler particles and the reduced agglomeration after stretching.

Figure 10A:
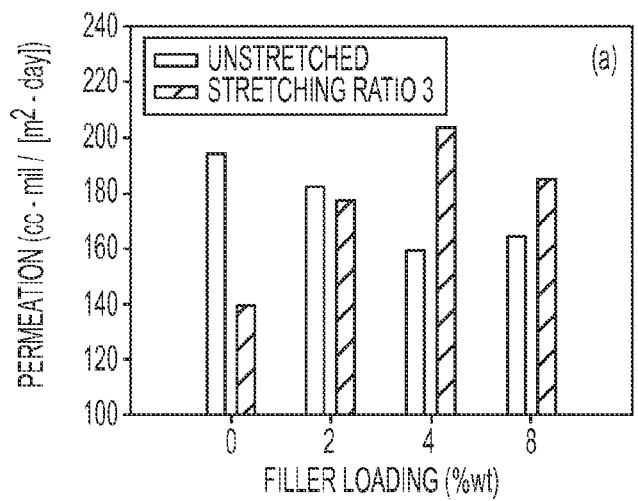
FIG. 10 illustrates oxygen permeability of neat PET and PET-CKao composites: (a) effect of filler loading, (b) effect of stretching temperature, and (c) effect of stretching ratio.

FIG. 10 shows oxygen permeability of neat PET and PET-CKao composites as a function of filler loading, temperature, and stretching ratio respectively. As shown in FIG. 10a, the PET-CKao composites have better barrier properties (lower OTR) than neat PET. The main reasons for this barrier improvement are: (i) decrease of the solubility of oxygen due to the reduced volume fraction of PET in composites (PET volume fraction <1) compared to neat PET samples (PET volume fraction=1) and (ii) increase in the tortuosity of the gas diffusion path by CKao particles. There was an 18% reduction in OTR coefficient at 4 wt % CKao loading. However, for filler loadings higher than 4 wt %, due to the agglomeration of particles, the filler content does not significantly influence the permeability. As can be observed, permeability of 8 wt % composite is only slightly higher than that of 4 wt % composite.

After stretching, an opposite trend is observed in the barrier properties. For stretched samples the permeability increases with the filler content. Three different parameters can affect the permeability of composites: the barrier effect of particles as impermeable obstacles, the amount of crystalline domains in the sample, and the agglomeration of particles. Increasing the CKao content enhances the relative crystallinity of PET (FIG. 8) and, at the same time, facilitates the formation of agglomerates in the composite. For stretched samples with filler content up to 4 wt %, the effect of crystallinity is dominant. However, at higher filler loadings, agglomeration of particles, debonding at the interface, and formation of voids compensate for crystallinity effect and augment OTR values.

Figure 10B:
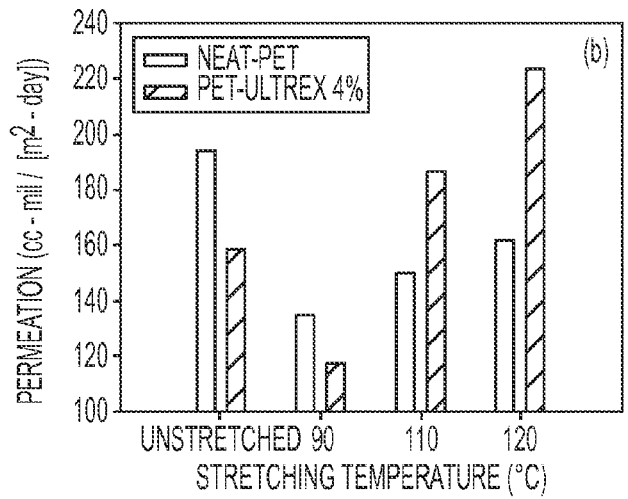

FIG. 10b displays the oxygen permeability of samples stretched at different temperatures. The lowest oxygen permeation was observed for samples stretched at 90° C. and it was increased at higher stretching temperatures because the orientation and crystallinity of the samples stretched at 90° C. are much higher than that of the others. PET-CKao composites stretched at temperatures higher than 90° C. show higher permeation compared to neat PET which again can be assigned to the effect of crystallinity and formation of micro-voids as discussed in previous section.

Figure 10C:
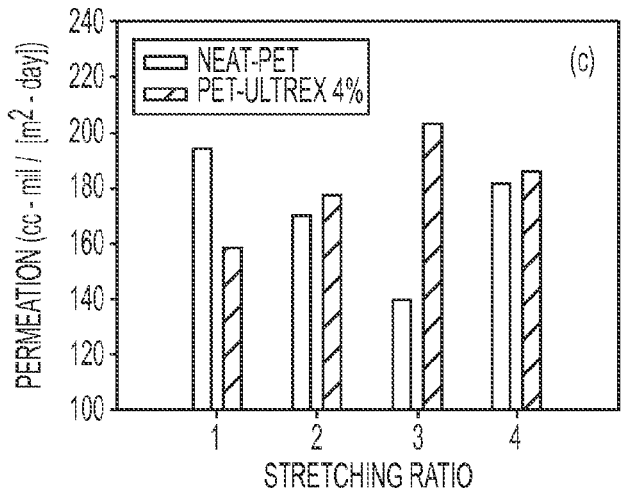

The effect of the stretching ratio on the permeability of PET composites has been studied as well, and the results are shown FIG. 10c. The permeation of neat PET decreases by applying higher stretching ratio up to 3, after which it shows an increase. However exactly the opposite trend was observed in case of filled PET.

Figure 11A:
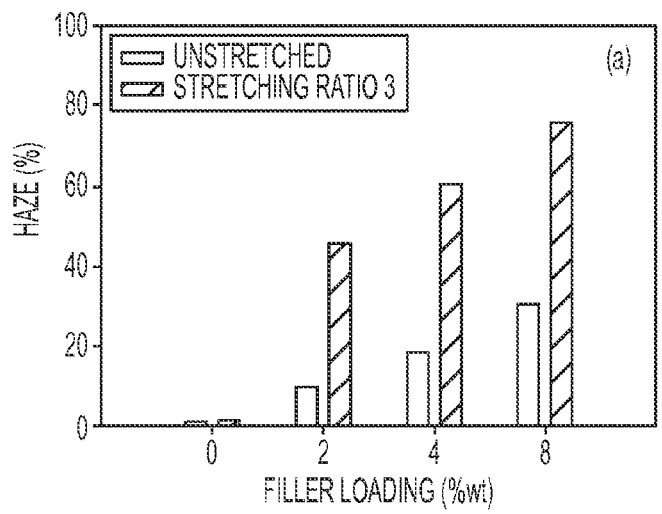
FIG. 11 illustrates haze of neat PET and PET-CKao composites: (a) effect of filler loading, (b) effect of stretching temperature, and (c) effect of stretching ratio.

FIG. 11 depicts the haze values of neat PET and PET-CKao films as a function of filler loading, temperature, and stretching ratio respectively. Haze describes the ability to divert light in a material (lower is the haze, more transparent is the material) and is defined as the percentage of light that is deflected more than 2.5° from the incident light direction. The haze is remarkably affected by the presence of the filler and increases with the CKao content. The higher the concentration of filler and larger are the aggregates, the more haziness in the film would be observed. As shown in FIG. 11a, the haze jumped from 0.8% for neat PET to 30% for PET-CKao 8%. This can be explained by the dispersion level and size of the CKao particles inside the PET matrix. FIG. 12 displays SEM micrographs of the cross section of stretched neat PET and PET-CKao composites. It is evident from the images that the size of the dispersed particles is of the order of magnitude of the wavelength of visible light which can cause light diffraction and make the samples hazier.

FIG. 11a shows also that hot stretching has a significant influence on the haziness of PET-CKao films. After being stretched, the haze jumped from 10% to 45%, from 19% to 60%, and from 30% to 75% for PET-CKao composites containing 2 wt %, 4 wt %, and 8 wt % CKao, respectively. One should note that the haze can be affected by many factors other than particle dispersion. The formation of voids and micro-cracks in the sample seems to be one of the main reasons. As discussed above, during the stretching process, debonding between filler particles and the PET matrix takes place and some voids and cracks are formed around the particles. These voids, that are elongated in the stretching direction (FIG. 12b), can cause additional scatter of light. The size of the voids in the film increases as a result of stretching and cause more haziness in the films.

Figure 11B:
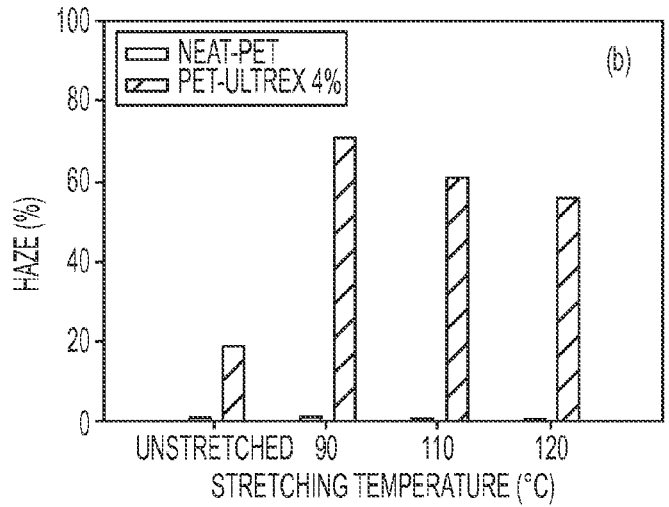
Figure 11C:
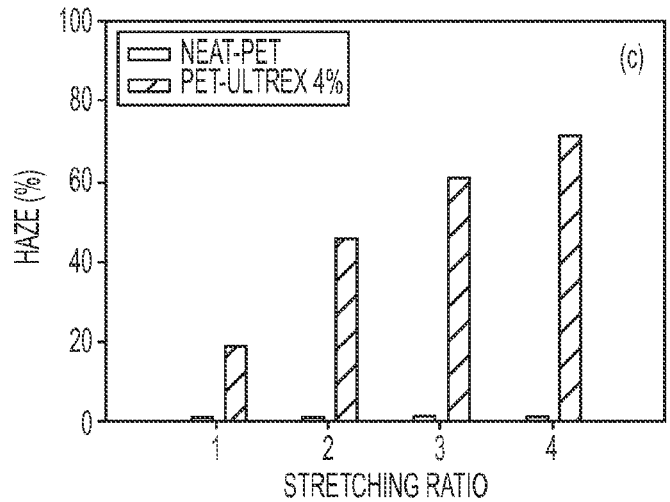
Figure 12:
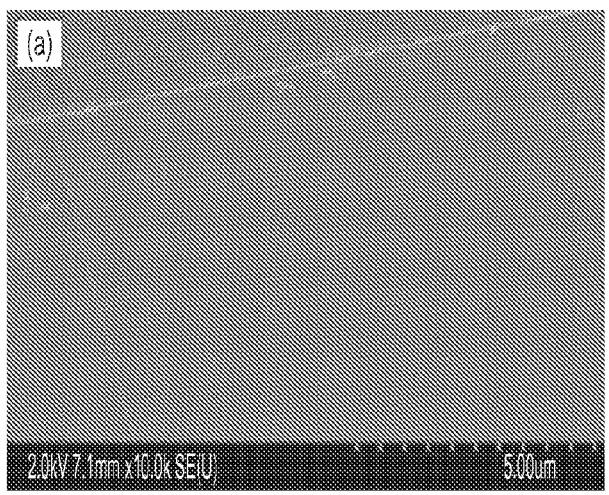
FIG. 12 shows SEM micrographs of (a) neat PET stretched at 90° C., (b) PET-CKao (4 wt %) stretched at 90° C., and (c) PET-CKao (4 wt %) stretched at 120° C. Stretching ratio was 3 for all samples.
Figure 12:
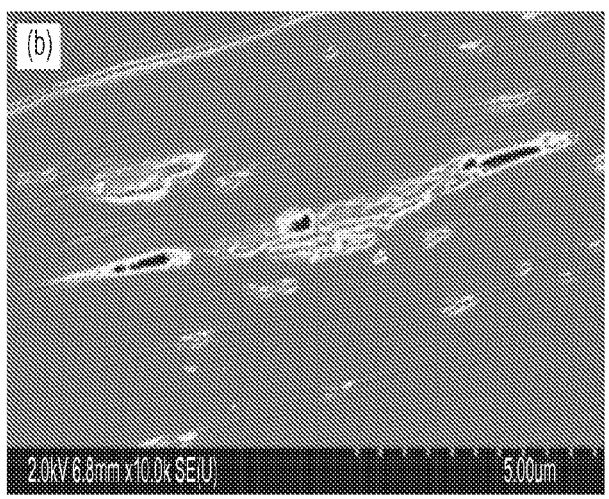
Figure 12:
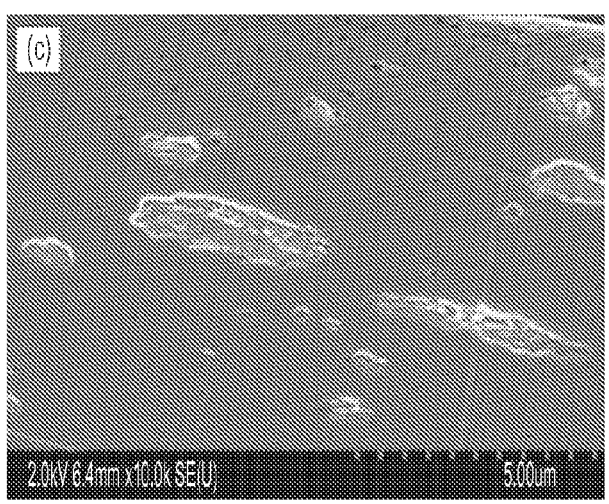

FIG. 11b shows the effect of stretching temperature on the haze. In the case of neat PET, the haze value remains less than 1% regardless of stretching temperature. By contrast, the haze of filled samples depends on the stretching temperature. As the stretching temperature increases, haze value decreases. According to DMA results, glass transition temperature ($T_g$) of PET falls between 85° C. and 90° C., therefore the modulus of PET would be remarkably decreased (more than 80%) when temperature is changed from 90° C. to 120° C. Therefore, due to low modulus at higher temperatures debonding is less likely to occur in the interface. Stretching ratio is another parameter that can affect the haze of composites. As shown in FIG. 11c, the higher stretching ratio results in higher haze in the samples. But again for neat PET the haze value is not changed by stretching ratio.

In sum, it was demonstrated that the incorporation of calcined kaolin has a positive effect on the thermo-mechanical and barrier properties of PET, although the presence of CKao may impair optical properties of PET and lead to haziness. DSC results showed that crystallization temperature of PET-CKao was shifted to higher values, compared to neat PET, due to the nucleation effect of filler particles and TGA analysis indicated a slight improvement of thermal stability of PET after the introduction of CKao particles. A silane treatment of particles and addition of chain extender were shown to promote the final properties of composites as well.

EXAMPLE 3

Phenoxy-Modified CKao Nanocomposite PET Structure

The PET resin used in this study was Laser+® 7000 supplied by DAK Americas LLC. It is a bottle grade PET resin with an intrinsic viscosity of 0.84 dL/g, a melting point of 242° C. and 35% crystallinity. The filler was a calcined grade kaolin with a specific gravity of 2.63 g/cm$^3$ supplied by BASF Corporation. Sodium hexametaphosphate (SHMP), purchased from Sigma-Aldrich, was added to the grinding media, to prevent agglomeration in the grinder. Phenoxy resin additive (PKHA), a linear poly hydroxy ether provided by InChem Corporation, was used in this work to modify the molecular weight of PET. Analytical grade sodium hydroxide (NaOH) and nitric acid (HNO$_3$), purchased from Sigma-Aldrich, were used as pH regulators.

Scanning electron microscope (SEM) microphotographs were obtained using in a Hitachi S4700 instrument with a cold field emission gun under an acceleration voltage of 2 kV. A JOEL JEM-2100F transmission electron microscope (TEM) operating at accelerating voltage of 200 kV was used to observe ultrathin sections of the samples and fully characterize the morphology. The samples were microtomed into approximately 50-80 nm thick slices using an Ultracut FC microtome (Leica, Germany) with a diamond knife.

Wide angle X-ray diffraction (WAXD) measurements were accomplished using a Philips X'Pert diffractometer (CuKα radiation, λ=1.54056 A°), operating at a voltage of 50 kV and current of 40 mA. The scanning rate was 0.02°/s and the 2θ ranged from 2° to 15°.

Rheological measurements were performed using a parallel plate stress-controlled rheometer (Gemini of Malvern) with a gap size of 1 mm and a plate diameter of 25 mm. Frequency sweeps were carried out in small-amplitude oscillatory mode at 270° C. in the frequency range of 0.628-628 rad/s. It was verified that all the measurements were in the linear viscoelastic range. The measurements were performed under nitrogen flow to avoid the thermal degradation and the temperature was controlled by a convection oven installed on the rheometer.

Differential scanning calorimetry (DSC) was conducted on a DSC Q1000 TA Instrument to study the melting and crystallization characteristics of the samples. The heating/cooling ramps with constant heating rate of 10° C./min were applied under helium atmosphere in the temperature range of 30-300° C. The thermal decomposition was studied by use of a TGA Q500 TA Instrument thermogravimeter. About 10 mg of the samples were heated at 10° C./min from 30 to 700° C. under a nitrogen atmosphere.

Dynamic mechanical analysis (DMA) was performed by using a DMA 2980 TA Instruments. The measurements were carried out on rectangular molded samples in the bending mode with a constant heating ramp of 5.00° C./min from 30 to 170° C. and a frequency of 1 Hz. An Instron universal tensile machine (Model 3365) with 500 N load-cell and a strain rate of 25 mm/min was used to measure the mechanical properties of PET nanocomposites at room temperature.

The oxygen transmission rate (OTR) was measured at 23° C. under barometric pressure 700 mmHg using an Ox-Tran oxygen permeability MD Module (Model 2/21) from Mocon Incorporation. The permeability coefficients were reported after normalizing by the films thickness (OTR×thickness).

Optical properties were determined according to ASTM D1003 using a LAMBDA 1050 spectrophotometers from PerkinElmer.

Partica LA-950 laser diffraction particle size distribution analyzer (HORIBA Instruments Inc.) was used to obtain the particle size distribution of the particles. The measurements were performed on a diluted aqueous suspension of the particles (sonicated for 20 sec).

Figure 13:
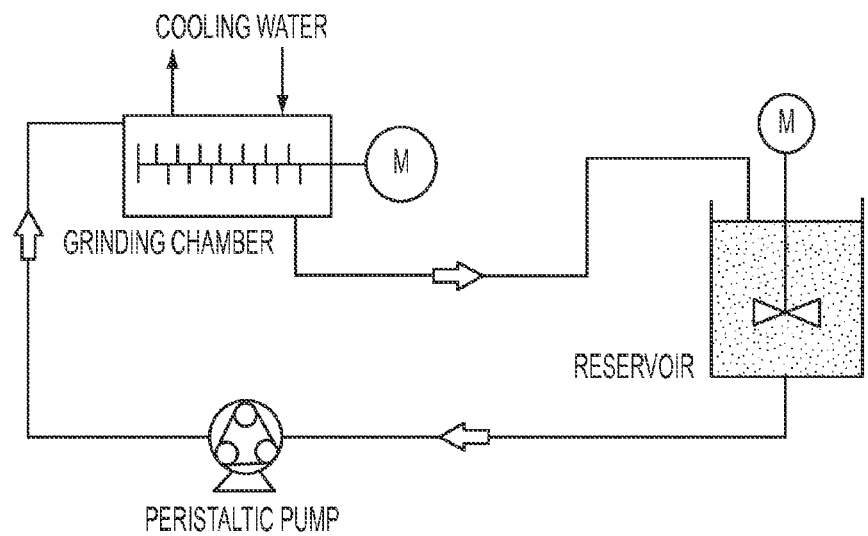
FIG. 13 is a schematic diagram of a grinder for processing CKao particles.

Grinding of the calcined kaolin particles was carried out in a MINIFER agitator bead mill (NETZSCH, Germany) in circulation mode. A schematic diagram of the grinder setup is shown in FIG. 13. Zirconium oxide beads (NETZSCH, Germany) rage from 0.1 to 0.2 mm in diameter were used as grinding media. The rotation speed of the agitating shaft was set at 2000 rpm. The particles were dispersed in distilled water and 1 wt % SHMP was added to the mixture under vigorous agitation. pH was adjusted in the range of 7-8 by drop wise addition of diluted NaOH and/or HNO$_3$. The suspension was put in the reservoir to be pumped into the grinding chamber for a given period of time.

Nanocomposites were prepared in a two-step process. PET granules were initially ground in liquid nitrogen and then were mixed with ground calcined kaolin (gUlt) in a co-rotating twin-screw extruder (Berstorff ZE25, screw diameter (D)=25 mm, L/D=28) in order to obtain a 15 wt % masterbatch. The processing temperature and screw speed were set at 270° C. and 150 rpm respectively. In the second step, PET-gUlt masterbatch was diluted with neat PET in a Killion single screw extruder (D=45 mm) to produce the final nanocomposites with given filler loadings. The temperature profile was set in the range of 250-275° C. and the screw rotating speed was 25 rpm. PKHA (4 wt %) was added to the composites in the second extrusion step. All the materials were well dried in a vacuum oven at 110° C. for 24 h before being processed to eliminate the moisture and avoid degradation reactions in PET during the melt compounding.

The operating conditions of the grinder such as grinding media loading, pH, surfactant concentration, rotation speed, and grinding media size were optimized and kept constant during the experiments. These operating conditions did not have a great effect on the final product except for the dispersant aid and the pH adjustment. Nanoparticles have a high tendency to aggregate in the grinding chamber, where the particles collide to each other and aggregation is very likely. Therefore addition of grinding aid (surfactant) to the media seems to be inevitable. SHMP can affect the grinding process by acting as a dispersant which can hold the particle apart by electrostatic or steric repulsion. The grinding aid also makes it possible to increase the particle loading in wet grinder by reducing the viscosity of the suspension.

Figure 14:
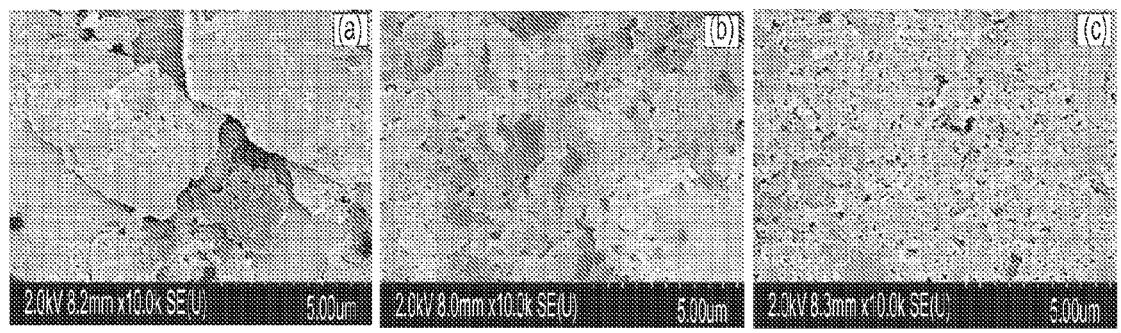
FIG. 14 provides SEM micrographs of CKao ground for different periods of time: (a) 0 min, (b) 60 min, and (c) 180 min.

FIG. 14 shows SEM images of calcined kaolin ground for different periods of time. For as-received material, there are a number of fine particles alongside some large flat crystal planes (FIG. 14a). In fact a mixture of primary particles and large agglomerates with sizes ranging from hundred nanometers to 20 µm are seen in the image. After 60 min, large particles are disappeared and smaller particles (<1 µm) can be observed (FIG. 14b). The grinding process causes the breakage of large platelet and formation of some finer particles, although some larger platelets remain. After 180 min of grinding the alteration of structure of particles is clearly observed, the large plates does not exist anymore and many nanoparticles with sizes around 250 nm are appeared instead (FIG. 14c).

Figure 15A:
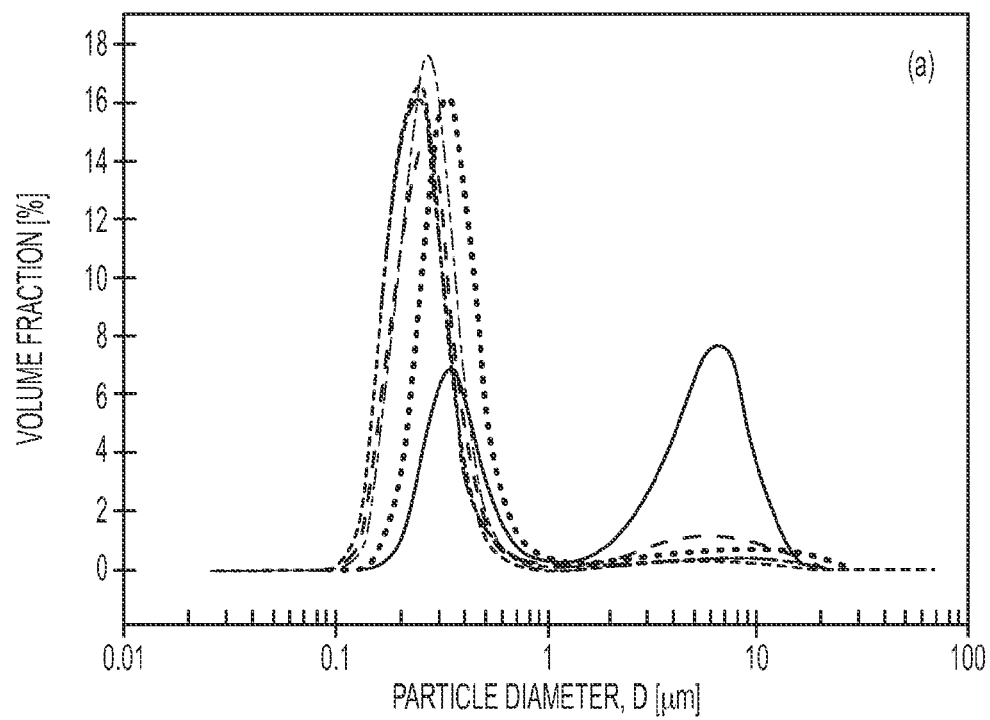
FIG. 15 shows particle size distribution as a function of grinding time.
Figure 15B:
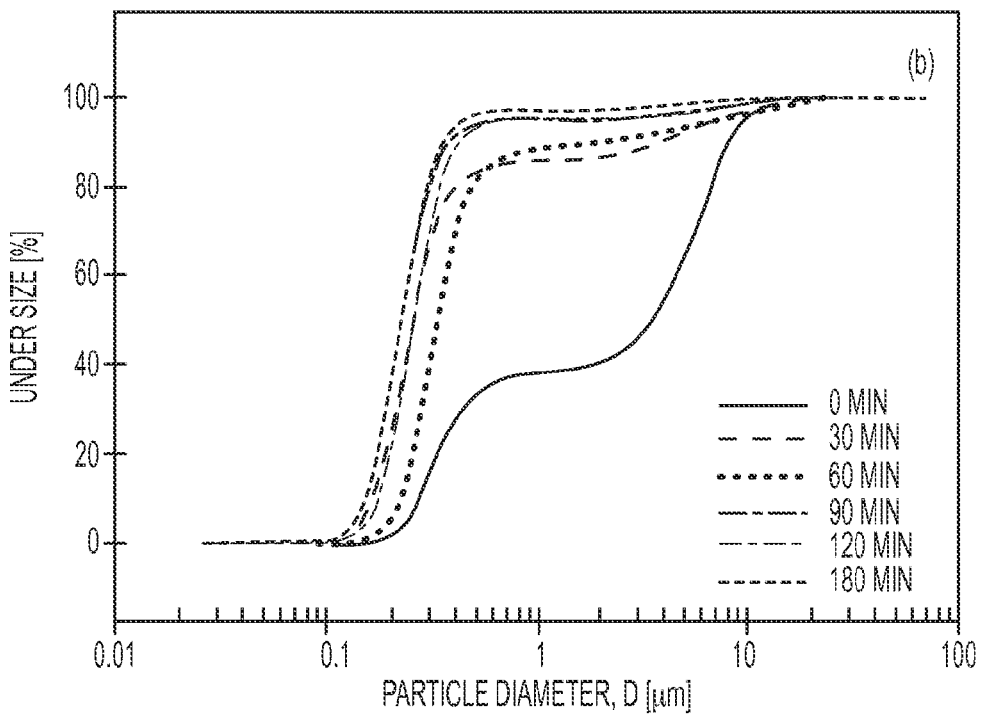

FIGS. 15a and 15b illustrate the particle size distribution (PSD) of samples as a function of grinding time (up to 180 min) measured with a laser particle size analyzer. Particle size measurements were performed on the feed and product material and then the mean particle size was calculated. After 60 min of grinding, 90% or more of the products were 1 µm or less, and after 120 min, a small fraction of the particles (<4%) were larger than 1 µm. Although the mean particle size decreased with time, it was noted that after 120 min it approached a constant value about 240-260 nm and remained almost unchanged thereafter (FIG. 15b). It seems that there is a limitation for the smallest size we can achieve and excessive grinding does not decrease the particle size anymore.

Figure 16:
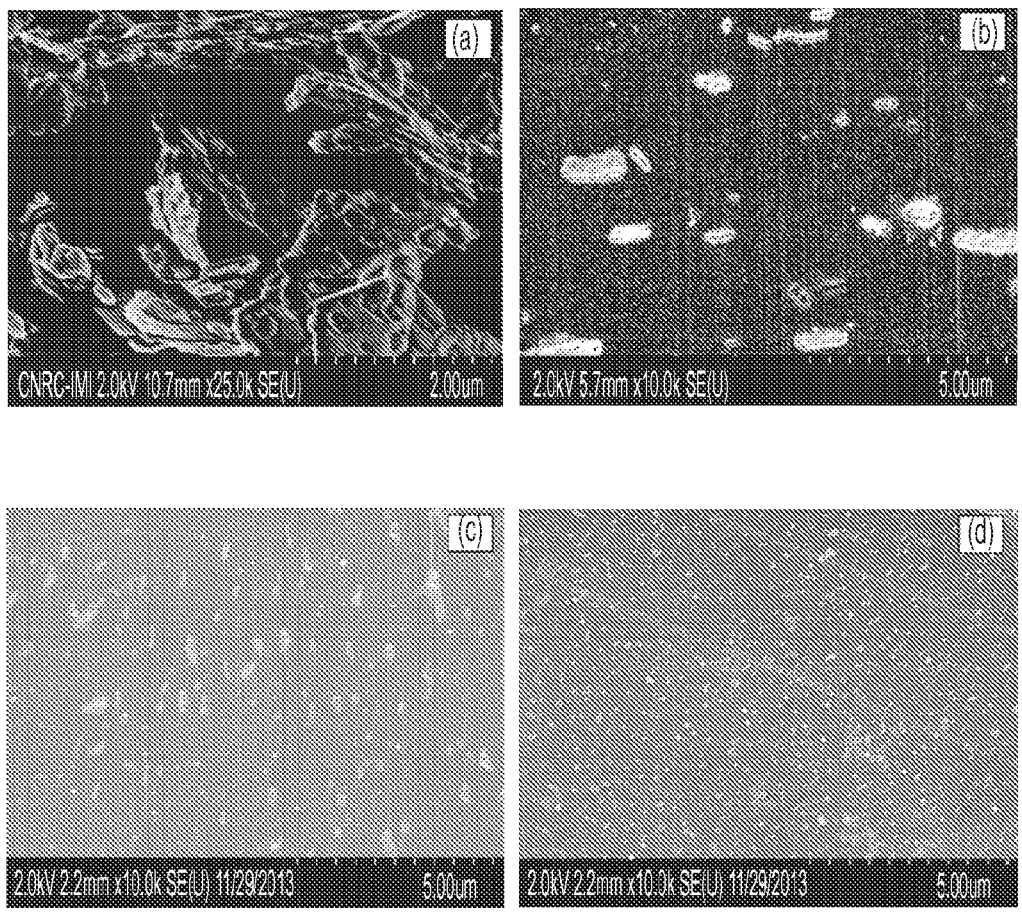
FIG. 16 shows SEM micrographs of: (a) as-received CKao, (b) PET-CKao 2%, (c) PET-gUlt 2%, and (d) PET-gUlt 2%-PKHA.

The SEM images in FIG. 16 show the morphology of as-received calcined kaolin and PET-gUlt nanocomposites. One can see that large agglomerates of calcined kaolin particles are dispersed and submicron particles, observed as white spots, are distributed within the PET matrix.

Figure 17:
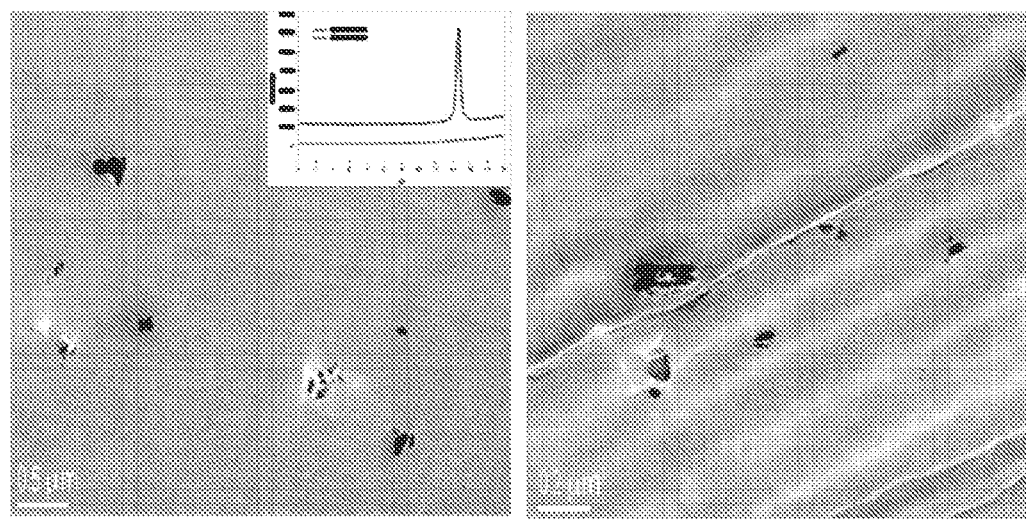
FIG. 17 provides TEM micrographs of PET-gUlt 2%-PKHA nanocomposite.

The transmission electron micrograph (TEM) of the PET-gUlt 2%-PKHA nanocomposite is shown in FIG. 16. The nanocomposite seems to have a particulate nanostructured morphology. It is apparent that the morphology of calcined kaolin particles is different from what observed for other layered-structure nanocomposites so that the irregularly shaped particles, sized in the range from 50 to 200 nm, are observed rather than individual layers. It should be noticed that layers of calcined kaolin were not observed even at very high magnifications. Since the calcination process is associated with the collapse of the interlayer spaces and a disappearance of the basal distances, calcined kaolin may not be considered as a layered structure. A simple comparison between the XRD patterns of calcined and hydrous kaolin (shown in FIG. 17) confirms the structural alternation of particles as a result of calcination. It is shown that the characteristic peak of hydrous kaolin at $2\theta=12.4°$, indicating the d-spacing of 0.72 nm between the layers, is not observe for calcined kaolin.

Figure 18A:
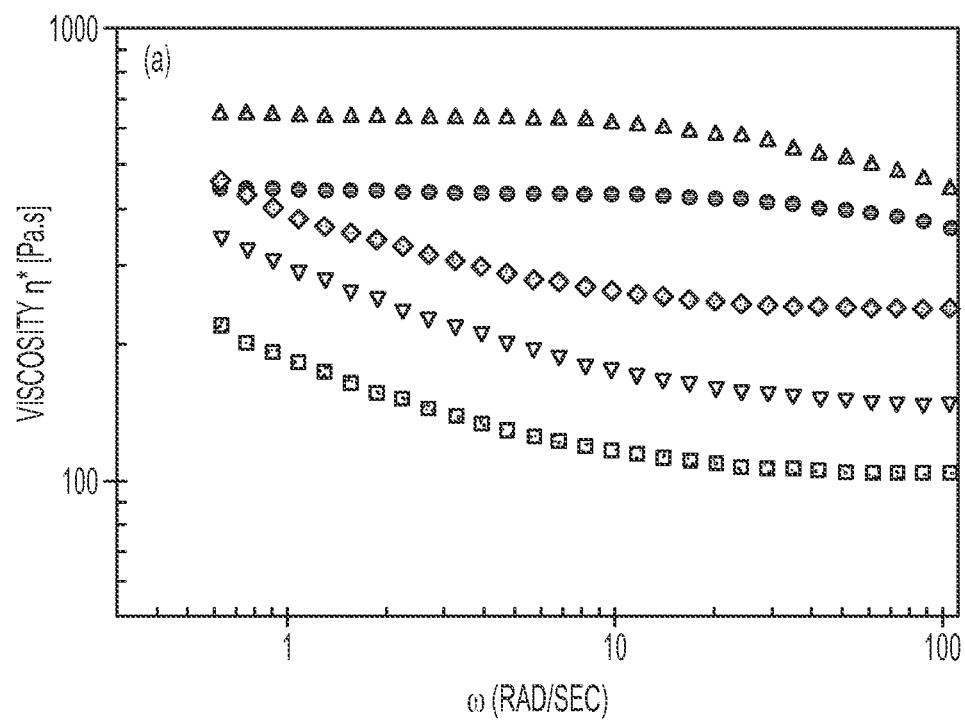
FIGS. 18a and 18b show complex viscosity and elastic modulus, respectively, of neat PET and the PET nanocomposites measured at 270° C. as a function of frequency.

FIG. 18a shows the complex viscosity ($\eta^*$) of neat PET and PET nanocomposites measured at 270° C. as a function of frequency. The neat PET and PET-PKHA exhibited a Newtonian behaviour at low frequencies with a shear thinning exponent, n, of −0.02. For PET-PKHA the Newtonian plateau was shorter due to the effect of phenoxy resin. The PET-gUlt nanocomposite with 2 wt % filler content showed shear thinning behavior with an exponent n equal to −0.30. As the loading increased, the complex viscosity curve shifted to lower values, however, the shear thinning trend remained the same. The viscosity loss is due to the degradation of PET during the melt processing which consequently decreases the molecular weight of the polymer. The addition of PKHA could compensate this loss to some extent, as shown in FIG. 18a.

Figure 18B:
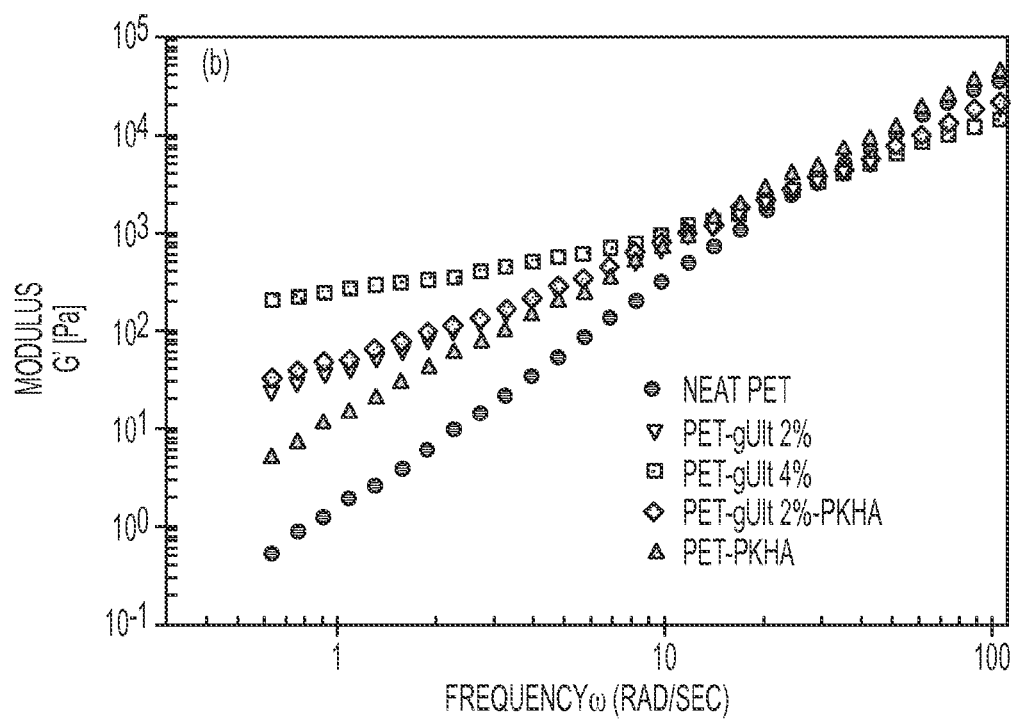

Storage modulus (G') of neat PET and PET-gUlt composites measured as a function of frequency and the results are presented in FIG. 18b. The rheological behavior of the nanocomposites was totally different from that of neat polymer. The typical power law rule, $G'\sim\omega^2$, was valid for unfilled polymer (PET and PET-PKHA) at low frequencies. The rheological behavior in the terminal zone was however altered after the introduction of gUlt particles to the system so that G' increased dramatically and the dependence of G' on ω became smaller at low frequency. This behaviour was also observed for other polymer nanocomposites such as poly(propylene), polystyrene, polyamide-12, and poly(lactic acid), and was attributed to a pseudo-solid-like structure or a network of nanoparticles in the material which restrains the long-range motion of polymer chains. By increasing the filler loading from 2 to 4 wt %, storage modulus increased at low frequencies and the terminal slope of the G' declined from 1.04 to 0.42. The addition of PKHA slightly affected the G' and reduced the terminal slope to 0.90 which highlights the important role of matrix viscosity on the dispersion of particles.

At high frequencies, the effect of gUlt particles on the rheology is not considerable and the behavior of melt will be dominated by the PET matrix. The nanoparticles may restrain the large-scale relaxations of polymer chains in a nanocomposites, however, they do not have a remarkable impact on the short-range dynamics of the chains in length scales comparable to the entanglement length. At high frequencies, the difference between the G' of neat and filled PET was much smaller and G' decreased with particle loading due to possible degradation of the PET matrix.

Figure 19A:
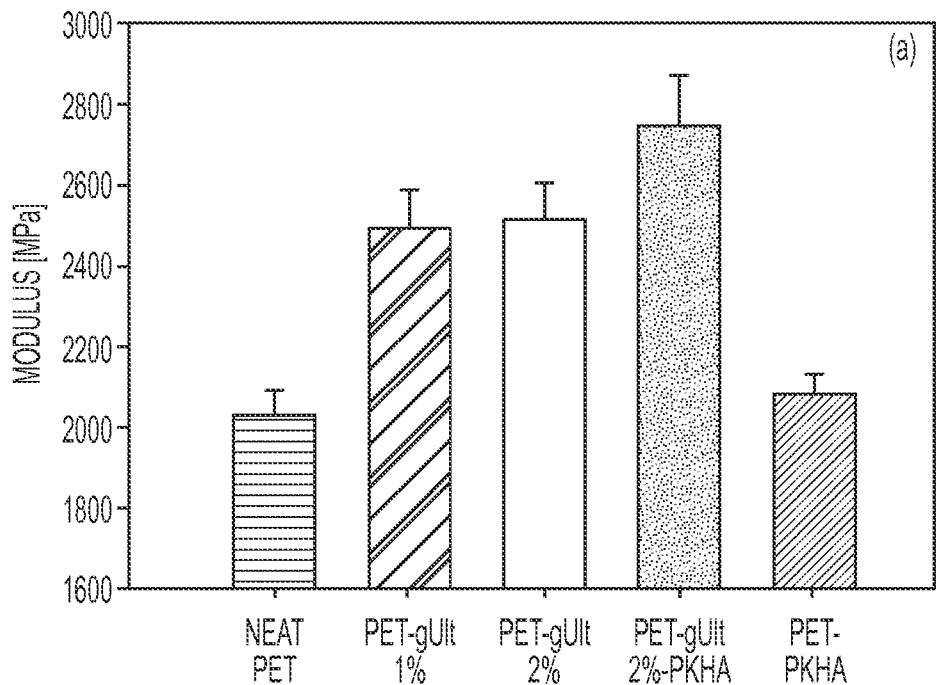
FIGS. 19a and 19b show tensile modulus and elongation at break, respectively, of neat PET and PET-gUlt nanocomposites.

General speaking, the addition of nanoparticles into polymer matrices is expected to improve the final properties. The tensile modulus and the elongation at break of neat PET and PET-gUlt nanocomposites were determined by tensile machine and are shown in FIG. 19. It was observed that the elastic modulus increased upon the addition of 1 wt % gUlt particles. However, with increasing the filler content to 2 wt % further improvement was not observed. Since the enhancement of composites is directly depends on the interactions between the filler and the matrix in the interface, the dispersion level and surface area of the particles might be a critical parameter affecting the final properties. It seems that increasing the filler loading leads to the partial aggregation of particles which subsequently decreases the surface area.

With the addition of PKHA the improvement was higher and 35.6% improvement was observed in elastic modulus. This could be assigned to the increased molecular weight of PET matrix in presence of phenoxy resin, as shown by rheological measurements.

Figure 19B:
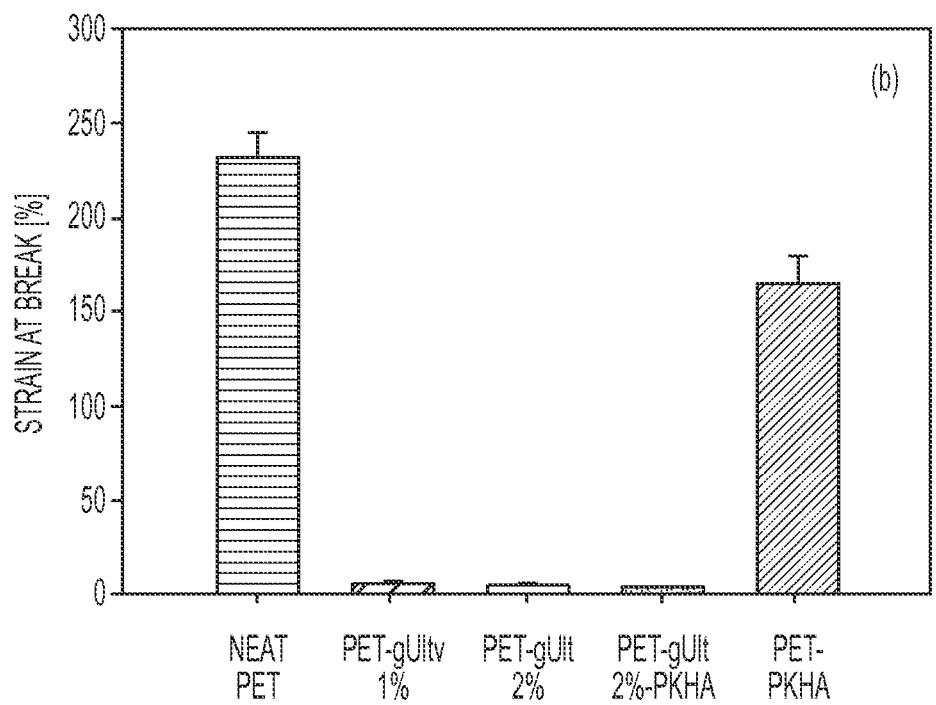

Transition from ductile to brittle behavior in the stress-strain response is one the characteristics of polymer nanocomposite. As shown in FIG. 19b, the improvement in modulus of PET nanocomposites was associated with a drastic reduction in elongation at break. The same effect has been reported for other nanocomposite and some reasons such as restricted mobility of the polymer chains due to the interaction with nanoparticles, stress concentration around the particles, and failure of filler aggregates have been mentioned to explain this brittle behavior.

Figure 20A:
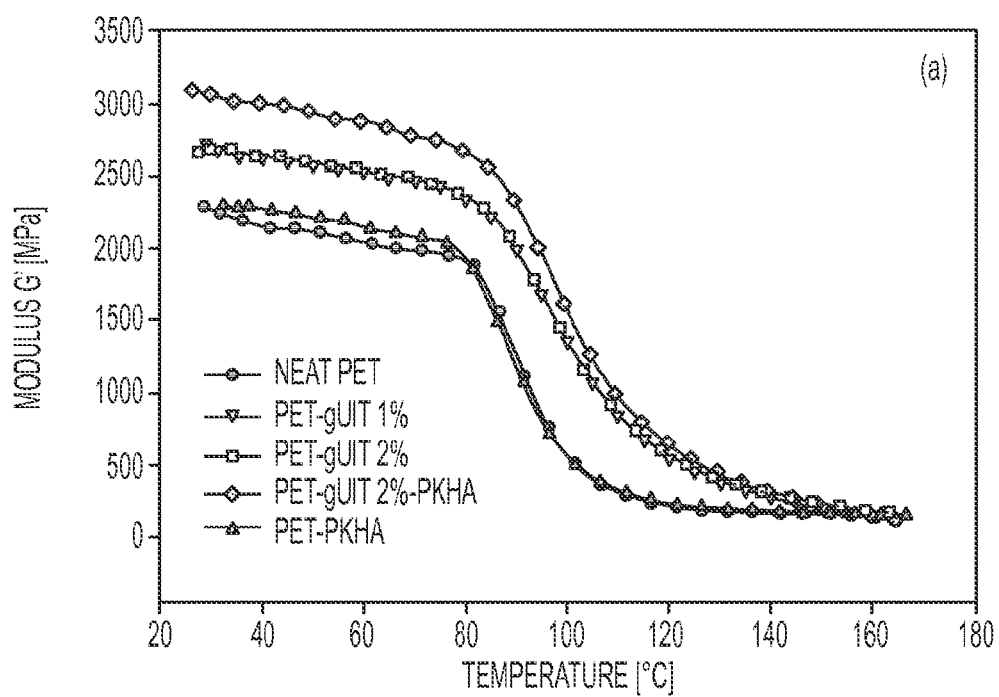
FIGS. 20a and 20b show temperature dependence of storage modulus and tan δ, respectively, measured by DMA at 1 Hz.

The storage modulus and tan δ temperature dependencies for neat PET and the PET-gUlt nanocomposites are shown in FIG. 20. The nanocomposites exhibited higher storage modulus over the entire temperature range (25-170° C.)

compared to neat PET. Table 2 presents the ratio of the storage modulus of the composite ($G'_{com}$) to that of neat PET ($G'_{PET}$) at 40° C. With the addition of 2 wt % gUlt, the modulus was improved by 21% and the improvement was more pronounced in case of samples containing both gUlt and PKHA (40%). This may be ascribed to the higher molecular weight of PET-gUlt-PKHA compared to that of PET-gUlt. As shown by rheological measurements, PKHA can lessen the degradation of PET during the extrusion process which results in a higher molecular weight of the PET matrix.

Figure 20B:
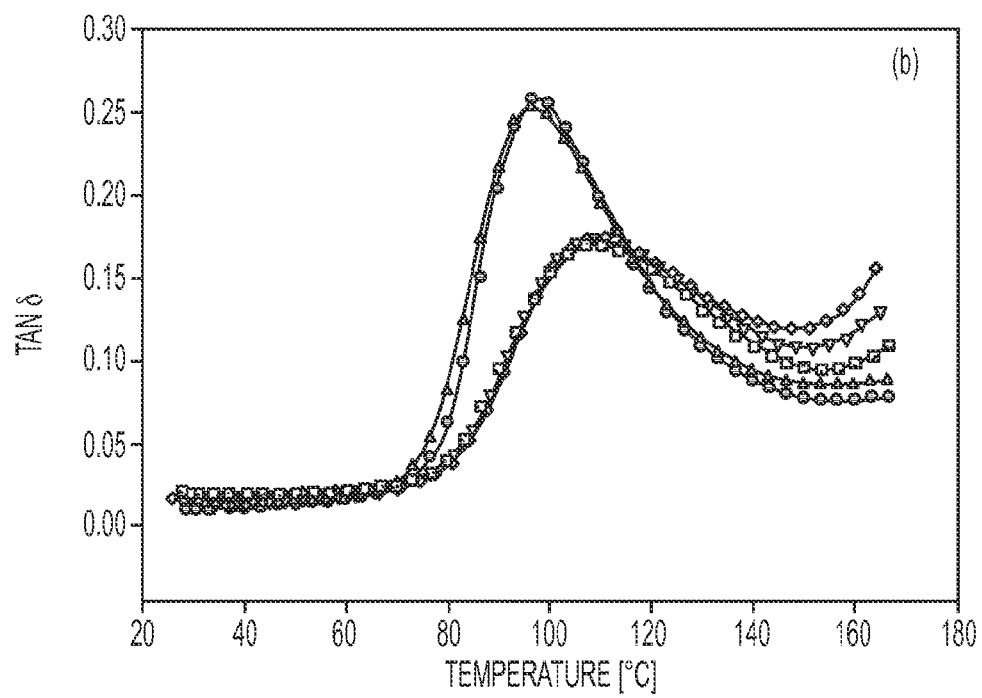

As shown in FIG. 20b, the tan δ that corresponds to the dissipation of the energy showed a peak at about 97 and 110° C. for the neat PET and the nanocomposites, respectively. This peak is attributed to the glass transition temperature. After incorporation of gUlt nanoparticles, the tan δ peak shifted to higher temperatures by approximately 11-13° C., furthermore the area under the tan δ peak decreased. The shift of the tan δ peak to a higher temperature may be assigned to restricting effect of particles on cooperative motion of PET chains. This effect was reported for other composite systems such as polyimide-clay nanocomposites and PVDF-clay nanocomposites.

The decrease in the height of tan δ peak could be attributed to the confinement of polymer chains by nanoparticles. The magnitude of tan peak is directly proportional to the free motion of polymer chains within the amorphous phase, therefore the neat PET with higher amorphous fraction exhibits higher tan δ peak. The crystallinity and particle-polymer interactions may constrain the PET chains and hinder their free motion. By incorporation of gUlt particles, the crystallinity of the samples did not change (Table 2); however, the volume fraction of polymer constricted by particles would increase which resulted in a lower magnitude of tan δ peak.

TABLE 2

Crystallinity of Samples and Ratio of Storage Modulus of Composite ($G'_{com}$) to That of Neat PET ($G'_{PET}$)

| | Relative crystallinity $X_c$ [%] | $G'_{com}/G'_{PET}$ |
| --- | --- | --- |
| Neat PET | 28.8 | 1 |
| PET-gUlt 1% | 29.8 | 1.22 |
| PET-gUlt 2% | 29.7 | 1.23 |
| PET-gUlt 2%-PKHA | 29.3 | 1.40 |
| PET-PKHA | 26.8 | 1.05 |

Figure 21:
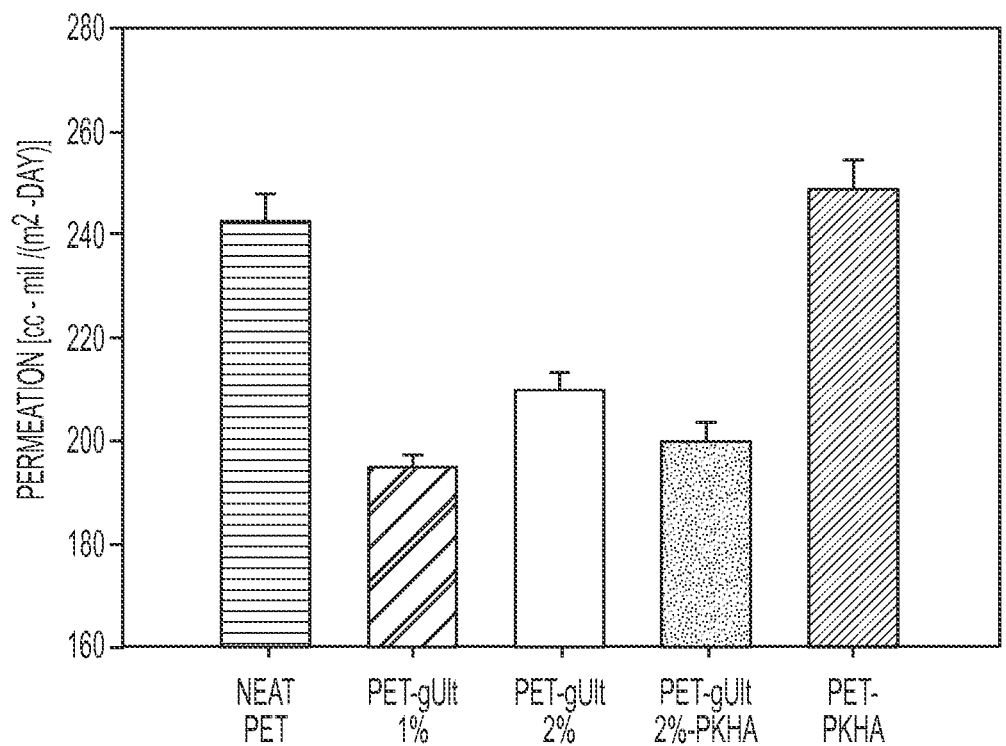
FIG. 21 shows oxygen permeability of neat PET and its nanocomposites.

FIG. 21 shows the measured oxygen permeability of neat PET and its nanocomposites. For all the filled samples, the permeability was lower than that of neat PET due to both the presence of gUlt particles and a higher crystallinity. By incorporation of gUlt nanoparticles to PET, about 20% reduction in oxygen permeability was observed. However, increasing the filler loading from 1 to 2 wt % slightly deteriorated the barrier properties which could be due to the agglomeration of particles by increasing the filler content. The improvement in barrier properties of polymer nanocomposites was attributed to the decrease of solubility (due to the reduced polymer matrix volume) and more tortuous path for penetrant molecules. The silicate particles distributed in the polymer matrix are assumed to be impermeable barriers which induce a longer diffusion pathway for diffusing molecules.

Figure 22:
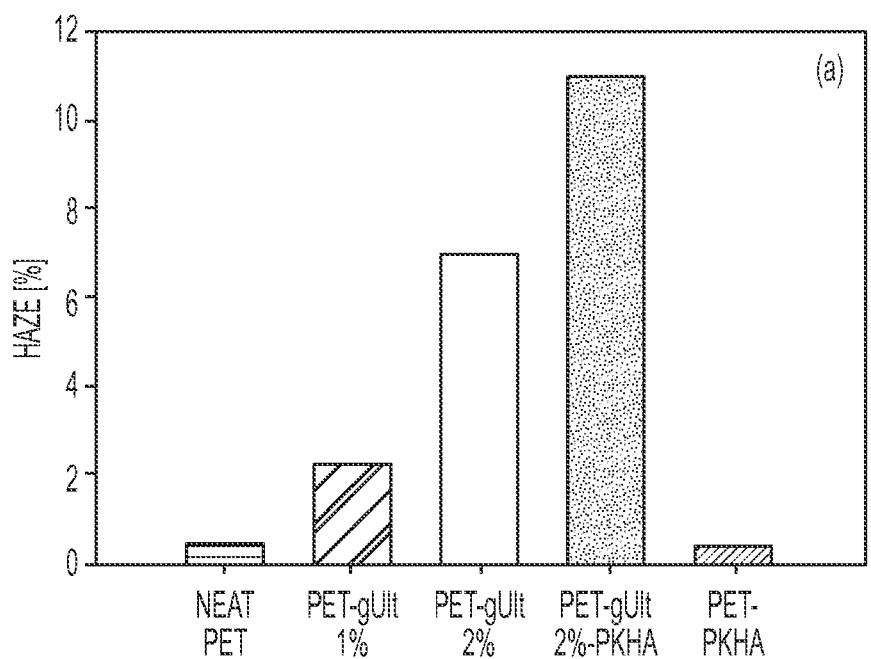
FIG. 22 illustrates optical properties of PET and its nanocomposites.
Figure 22:
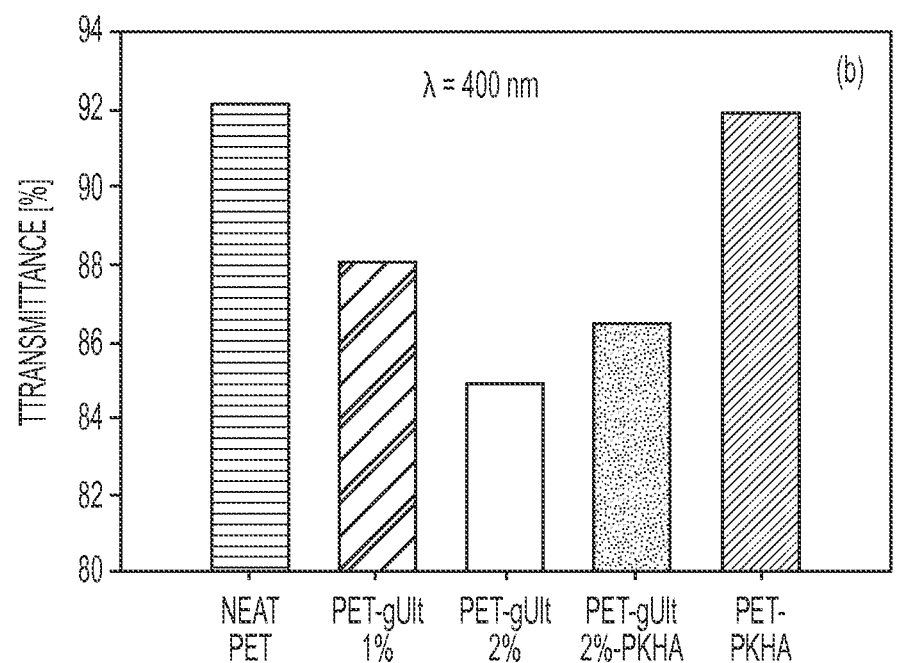

Haze percentage and light transmittance of neat PET and its nanocomposites are shown in FIG. 22. Due to scattering and absorption of light, all the nanocomposites had higher haze and lower transmittance with respect to neat PET. As shown in FIG. 22a, the haze jumped from 0.5% to 2.5 and 7% after incorporation of 1 and 2 wt % of particles, respectively and this increase in haze percentage was associated with a loss in transmittance. The addition of phenoxy resin did not have a big effect on optical properties of PET; however, a synergistic effect was observed in presence of gUlt particles. All of the PET nanocomposites prepared were optically transparent (meaning haze was lower than 30%).

Figure 23A:
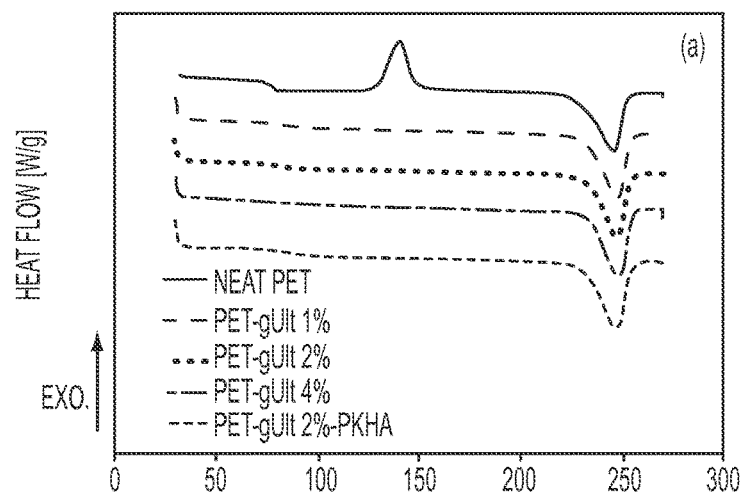
FIG. 23 provides DSC thermograms of PET and its composites: (a) heating, (b) cooling, and (c) heating after annealing at 200° C.
Figure 23B:
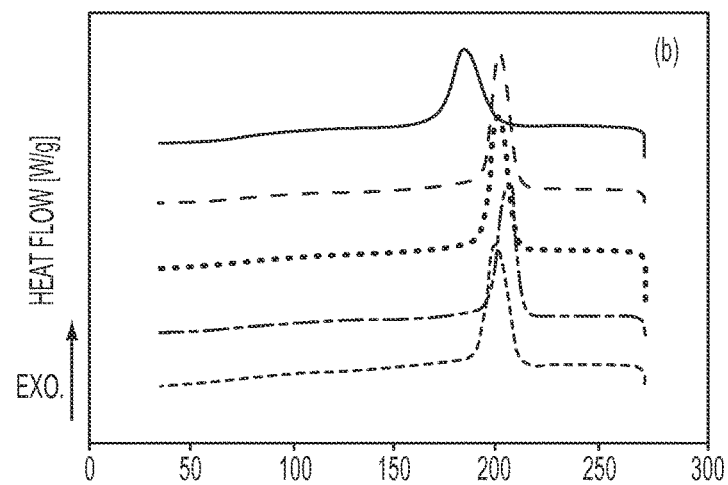

FIGS. 23a and 23b show the heating (melting) and cooling (crystallization) cycles for neat PET and its nanocomposites, respectively. The incorporation of gUlt did not have any effects on the melting behavior of PET and the melting peaks were observed around 246° C. in all cases, as shown in FIG. 23a. However, the relative crystallinity ($X_c$) of the nanocomposites was significantly higher than that of the neat PET, as observed in Table 3. The cold crystallization peak, observed for neat PET at 140° C., did not exist for nanocomposites. This indicates that recrystallization is hindered due to the incorporation of gUlt particles.

TABLE 3

DSC data of PET and its nanocomposites

| | $T_m$ (° C.) | $T_{c,m}$ (° C.) | $X_c$ [%] |
| --- | --- | --- | --- |
| Neat PET | 245.3 | 181.3 | 9.2 |
| PET-gUlt 1% | 246.8 | 198.8 | 28.2 |
| PET-gUlt 2% | 246.8 | 198.0 | 28.7 |
| PET-gUlt 4% | 246.5 | 202.1 | 29.2 |
| PET-gUlt 2%-PKHA | 246.9 | 188.2 | 27.6 |

The crystallization temperature ($T_{c,m}$) of nanocomposites was higher than that of the neat PET (FIG. 23b). The higher $T_{c,m}$ observed for the nanocomposites was related to the heterogeneous nucleation effect of the gUlt particles which could provide higher number of nuclei in the PET matrix. In the presence of gUlt the segments of the PET chains may interact with the particles to form the crystallization nuclei.

Figure 23C:
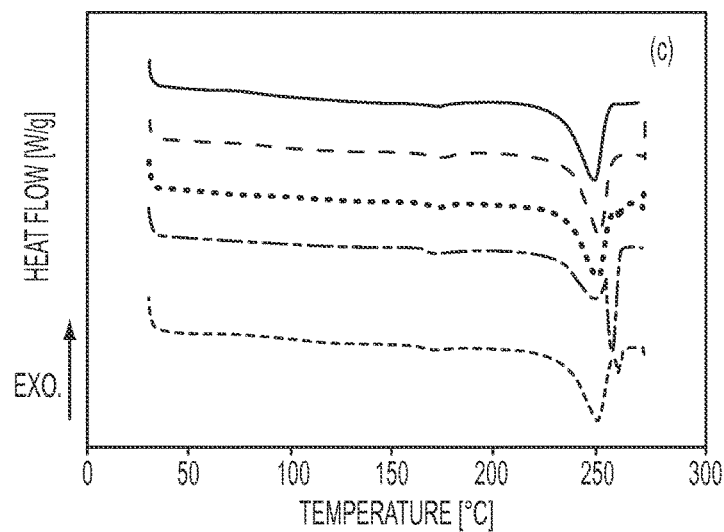

FIG. 23c shows the heating cycle of samples annealed for 1 h at 200° C.

The melting of annealed PET nanocomposites was reflected by a double-melting behavior, so that a new sharp peak appeared at about 257° C. and its magnitude gradually increases with increasing filler content. This behavior could be assigned to the melting/recrystallization of primary crystals during the heating process which results in the formation of two crystalline phases with different sizes, thickness and ordering. The melting of crystals restrained by the filler particles could be another reason.

In summary, ground calcined-kaolin nanoparticles (gUlt) were prepared by use of stirred media wet-grinder and then were dispersed in a PET matrix via melt extrusion technique to form PET-gUlt nanocomposite. SEM and TEM micrographs revealed that the ground particles are uniformly dispersed in the matrix. It was also shown that the addition of viscosity modifier (PKHA) can significantly improve the dispersion of particles. Rheological frequency measurements confirmed the formation of a network-like structure in the samples due to the particle-particle or particle-polymer interactions. It was also noticed that the incorporation of particles resulted in a viscosity loss. However the addition of a phenoxy resin modifier (PKHA) could compensate this viscosity loss to some extent.

DMA and tensile tests showed that the modulus of all nanocomposites were enhanced. The highest improvement (about 40%) was observed for the composite containing 2 wt % of gUlt and phenoxy resin (PKHA), however, the elongation at break was remarkably reduced due to brittleness induced by the presence of nanoparticles. The incorporation of gUlt particles improved the barrier properties of PET as well. The particles caused more haziness in the films, however, the nanocomposites were still transparent. Due to the degrading effect of gUlt particles on PET chains, the nanocomposites exhibited smaller viscosity compared to that of neat PET. The thermal properties such as crystallinity and crystallization temperature of PET were considerably altered as a result of nucleating role of particles.

The above illustrative scenarios are non-limiting, as steps may be added, removed, combined, split, and/or reordered. Other specific types of hardware and/or equipment commercially available and well known to those of ordinary skill and may be used other than those recited above. While certain illustrative embodiments have been described, it is to be understood that such embodiments are merely illustrative of and not restrictive on the methods and systems described herein.

We claim:

1. A method of preparing nanocomposite polyethylene terephthalate (PET) material comprising:
   physically treating a kaolin clay component;
   chemically treating the kaolin clay component with potassium acetate to form a modified kaolin clay component with intercalated potassium acetate; and
   mixing the modified kaolin clay component with PET to form the nanocomposite PET material.

2. The method of claim 1, wherein the step of physically treating the kaolin clay component precedes the step of chemically treating the kaolin clay component.

3. The method of claim 1, wherein the step of chemically treating the kaolin clay component precedes the step of physically treating the kaolin clay component.

4. A method of preparing a container comprising preparing a nanocomposite PET material according to the method of claim 1 followed by forming the container from the nanocomposite PET material.

5. The method of claim 4, wherein the container is transparent.

6. The method of claim 5, wherein the container is a carbonated soft drink container.

7. The method of claim 1, wherein:
   physically treating a kaolin clay component comprises physically treating a calcined kaolin clay component; and
   chemically treating the kaolin clay component with potassium acetate comprises chemically treating the calcined kaolin clay component.

8. The method of claim 7, wherein the step of chemically treating the calcined kaolin clay component comprises chemically treating the calcined clay component with an aqueous alcohol solution.

9. The method of claim 7, further comprising a step of mixing the modified kaolin clay component, the PET, or both, with a phenoxy resin component.

10. A method of preparing a container comprising preparing a nanocomposite PET material according to the method of claim 7 followed by forming the container from the nanocomposite PET material.

11. The method of claim 10, wherein the container is transparent.

12. The method of claim 10, wherein the container is a carbonated soft drink container.

* * * * *